(12) United States Patent
Bruening et al.

(10) Patent No.: US 7,783,030 B1
(45) Date of Patent: Aug. 24, 2010

(54) GRAPHICAL CALL-ROUTE SCRIPTING SYSTEM AND METHOD

(75) Inventors: Larry Keith Bruening, Eudora, KS (US); Shawn M. Draper, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1978 days.

(21) Appl. No.: 10/755,512

(22) Filed: Jan. 12, 2004

(51) Int. Cl.
*H04M 3/00* (2006.01)
*H04M 5/00* (2006.01)

(52) U.S. Cl. ............................ 379/266.07; 379/265.01; 379/265.05; 379/272

(58) Field of Classification Search ............ 379/220.01, 379/32.01, 207.01, 207.14, 266.07, 265.02, 379/265.01, 265.05, 265.11, 266.08, 272; 345/440; 706/55; 717/109, 115
See application file for complete search history.

(56) References Cited

U.S. PATENT DOCUMENTS

| | | | |
|---|---|---|---|
| 5,832,059 A * | 11/1998 | Aldred et al. ............ | 379/32.01 |
| 7,162,021 B1 * | 1/2007 | Johnson et al. ........ | 379/207.14 |
| 7,187,380 B2 * | 3/2007 | VanGilder .................... | 345/440 |
| 2003/0041314 A1 * | 2/2003 | Heeren et al. ................ | 717/109 |
| 2005/0097071 A1 * | 5/2005 | VanGilder ..................... | 706/55 |
| 2006/0188078 A1 * | 8/2006 | Jordan et al. ............ | 379/207.01 |

* cited by examiner

Primary Examiner—Thjuan K Addy

(57) ABSTRACT

A method, system, and medium are provided for creating and modifying how communications requests are routed in a communications network. The method includes displaying a graphical user interface (GUI) that includes a canvas and a set of geometric shapes that correspond programmatic code segments. As geometric shapes are added to the canvas, code segments are automatically generated depending on the relationship ad arrangement of the shapes. The code segments form a call-routing script, which dictates how physical communications requests are routed. The system includes a route script execution engine (RSEE), a set of route scripts to be processed by the RSEE and to dictate call routing paths, and a graphical route-scripting interface (which includes an arrangement of graphical objects that correspond to a programmatic composition of the route scripts). The modified arrangement of the plurality of graphical objects translates to a modification of one or more of the route scripts, and thereby to a modification of one more call-routing paths.

27 Claims, 14 Drawing Sheets

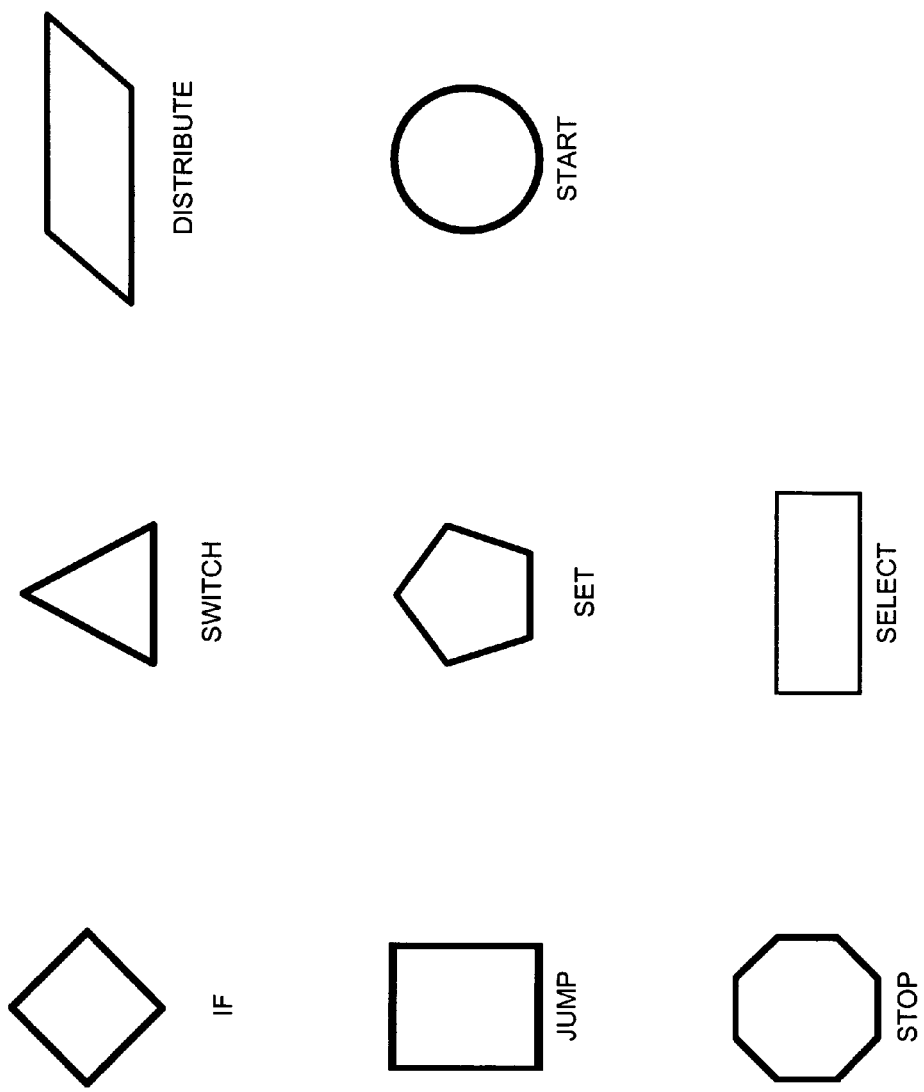

GRAPHICAL CALL-ROUTE SCRIPTING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of telecommunications. More particularly, the present invention relates to providing a new and useful method for dynamically modifying call-routing paths using a graphical interface.

BACKGROUND OF THE INVENTION

Individuals with visual or hearing impairments may have a more difficult time making telephone calls than persons without such impairments. For example, a person with a hearing impairment may not be able to use a common telephone because he or she cannot hear the called person. Similarly, if a person with a visual impairment wishes to surf the Internet, he or she may not be able to surf the Internet in a traditional fashion that relies on purely visual queues. Various technologies have emerged to help reduce or eliminate any such difficulties associated with routing telephony or Internet-related applications.

An exemplary technology utilizes a teletype (TTY) device to facilitate a phone call. This technology involves a hardware device to be used in connection with a standard telephone whereby a user keys-in words to convey. The call would be initiated by keying in a 1-800 number, for example, that connects to one of a group of call centers. A physical person, or agent, then serves as an intermediary between the calling person and the called person. The agent will orate typed messages from the caller and key-in voice messages received from the called party.

This scheme, however, does not take into consideration who will facilitate the call. A Spanish-speaking person may be routed to a call center and then randomly assigned to a person who cannot speak Spanish. Prior art technologies have attempted to satisfy technological and consumer demands to date, but the ever-growing needs of tomorrow will render many systems obsolete. The current state of the art does not enable an individual agent to be identified to facilitate a call.

The FCC implements several requirements to ensure that the service rendered to those with visual, hearing, or other impairments will be offered a level of service commensurate to others without those impairments. One such set of requirements includes the average speed of answer (ASA) requirements. Typically these requirements dictate that a communications agent must answer an in-bound call within 3.3 seconds.

Beyond FCC requirements, providing a high level of service to those that desire it offers unquantifiable advantages to those individuals and society as a whole. New technological innovations such as video relay, Internet relay and incorporating SS7 signaling into a TTY-type network is desirous. The systems of today wait to make call routing decisions until after the call arrives at a call center. Once the call arrives at the call center, no intelligence is provided to determine the best agent to receive the call. The status of agents and other resources are not monitored by other system components, which leads to prolonged wait times by those desiring to place a call. Systems that are used to make call routing decisions can be enhanced if scripting tools can be used in connection with those systems.

The call-routing systems of today do not offer an adequate level of scripting functionality that would otherwise translate to a more efficient call routing system. A call-routing script could provide the necessary logical instructions that dictate how communications requests flow through a network. But creating route scripts can be a time-consuming, resource-intensive process. Often, a person must be trained to learn a computer-programming language to originate a call-routing script. Even after the call-routing script is generated, it may need to be modified as bandwidth demands fluctuate. But modifying call-routing scripts has historically been a difficult thing to do, especially where significant changes are necessary and when the changes must be implemented in a small amount of time.

There is a need for an improved scripting tool that offers a high level of programmatic flexibility and utility to enhance the level of service offered to individuals with visual or hearing impairments. The current state-of-the-art would benefit from a graphical scripting interface that would allow an end user to dynamically modify call-routing scripts, or other code segments, to make changes to a call routing/agent assignment system.

SUMMARY OF THE INVENTION

The present invention solves at least the above problems by providing a graphical, user-friendly, route-scripting system that can be dynamically modified to meet routing fluctuating call-routing needs. The present invention has several practical applications in the technical arts including reducing the time and resources associated with reprogramming a call-routing solution at the code or command-line level and by simplifying the modification of call-routing scripts.

In one aspect, the present invention provides a computer-program product for developing call-routing instructions by displaying a graphical user interface (GUI) that has a canvas, providing a set of geometric shapes or other icons that corresponding to various tasks, arranging the shapes on the canvas, and establishing a relationship between the geometric shape. This relationship will create a programmatic flow diagram, from which a call-routing script is generated. Calls are then routed according to the generated call-routing script.

In another aspect, the present invention provides a method for dynamically rerouting calls or other communications in a communications network. The method includes routing calls based on a route script, generating a route script from a relationship of a set of graphical objects, modifying the relationship of the graphical objects, and then automatically modifying the route script in response to modifying the object relationships. Call-routing paths are then varied as a result of the modified route script.

In a further aspect of the present invention, 3.1. a method for assisting a user in creating a call-routing program is provided. The method includes providing a development environment that includes at least one or more graphical objects and a canvas, associating the graphical objects with respective computer-code potions, and providing for the arrangement of the graphical objects on the canvas. Thus, the arrangement generates a computer-program from the respective code portions.

In a still further aspect, the present invention provides a method for assisting a user in updating call-routing solutions in a communications-networking environment. The method includes providing call-routing scripts that dictate how a set of communications should be routed, providing a graphical representation of the call-routing scripts that includes a group of graphical objects where the arrangement of the objects corresponds to a programmatic code segment that composes the call-routing scripts. Manipulating the arrangement of the graphical objects translates to call-routing scripts being correspondingly modified so that communications requests are routed based on the modified call-routing scripts.

In a final exemplary aspect, the present invention includes a system for updating call-routing paths. The system includes a route script execution engine (RSEE), a set of route scripts to be processed by the RSEE and to dictate call routing paths, and a graphical route-scripting interface (which includes an arrangement of graphical objects that correspond to a programmatic composition of the route scripts). The modified arrangement of the plurality of graphical objects translates to a modification of one or more of the route scripts, and thereby to a modification of one more call-routing paths.

BRIEF DESCRIPTION OF THE SEVERAL VIEWS OF THE DRAWINGS

The present invention is described in detail below with reference to the attached drawing figures, wherein:

FIG. 4 depicts three illustrative screenshots associated with the DISTRIBUTE module in accordance with an embodiment of the present invention;

FIG. 9 depicts three illustrative screenshots associated with the SELECT module in accordance with an embodiment of the present invention;

FIG. 10A recapitulates and summarizes a portion of exemplary symbols that serve as programmatic-code representations in accordance with an embodiment of the present invention;

DETAILED DESCRIPTION OF THE INVENTION

Figure 1A:
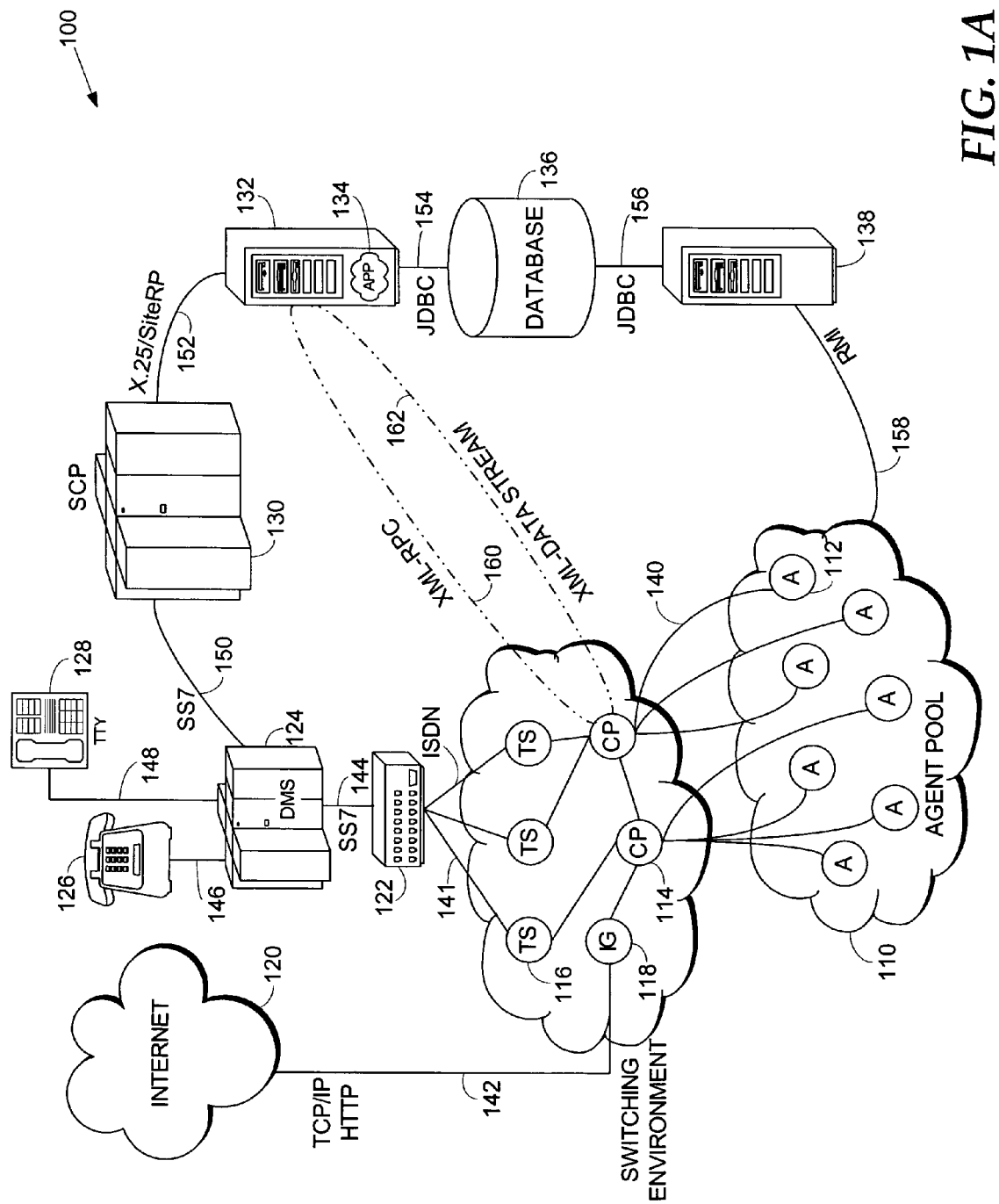
FIG. 1A depicts an illustrative operating environment suitable for practicing an embodiment of the present invention.

The present invention provides a graphical route-scripting interface that allows scripts to be created, edited, modified and managed using a graphical representation of route scripts used by a route script execution engine (described below). The preferred application of the present invention is in an environment where a calling persons is deaf or hard or hearing, or any other application where an intermediary who facilitates a call should be identified to enhance the callers experience.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ACD | Automatic Call Distribution (er) |
| ANI | Automatic Number Identification |
| ASA | Average Speed of Answer |
| CCITT | Comité Consultatif International de Télégraphique et Téléphonique (a.k.a. ITU) |
| CED | Call Entered Digits |
| CP | Call Processor |
| DMS | Digital Multiplex System |
| DNIS | Dialed Number Identification Service |
| EE | Execution Environments |
| FCC | Federal Communications Commission |
| FIFO | First in First Out |
| GUI | Graphical User Interface |
| II | II Digits or Information Digits |
| IPC | Inter-Process Communication |
| ISDN | Integrated Services Digital Network |
| JNI | Java Native Interface |
| LLA | Longest Available Agent |
| NRRM | Network Route Request Manager |
| PVC | Permanent Virtual Circuits |
| REM | Remote Enterprise Manager |
| RP | Routing Processor |
| RPC | Remote Procedure Call |
| RPCM | Route Processor Communication Manager |
| RSEE | Route Script Execution Engine |
| SCP | Signal Control Point |
| SCP | Service Control Point |
| SUTN | Special Unique Tracking Number |
| TTY | TeleType |
| VoIP | Voice Over IP (Internet Protocol) |
| WWW | World Wide Web |
| XML | Extensible Markup Language |

Further, various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference. For example, whereas some distinguish the World Wide Web (WWW) as a subcomponent of the Internet, "web" as used herein should not be construed as limited to the WWW. Rather, "web" is intended to refer generally to the Internet and/or its related subnetworks and subcomponents.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media includes both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprises computer-storage media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

The present invention provides intelligent and dynamic call-routing in a telecommunications networking environment and offers a survivable, scalable, scriptable environment, and network-based routing. The present invention enables calls to be routed to specific agents, agent activity and availability to be monitored, calls to be transferred, and a single-unified routing solution to be used for multiple entry points such as TTY, voice, and the Internet.

FIG. 1A depicts an illustrative operating environment suitable for practicing the present invention and is referenced generally be the numeral 100. Operative environment 100 includes an agent pool 110, which is made up a group of individual call agents ("agents") 112, a switching environment 113, one or more call processors 114, one or more telephony servers 116, an Internet gateway 118, a data network 120 such as the Internet, a signaling gateway/protocol converter 122, a digital multiplex system ("DMS") 124, a first telephony device 126, a teletype ("TTY") device 128, a service control point 130, a routing system 132 (which includes a routing application 134), a database 136, and an application server 138.

The aforementioned components should not be construed as restrictive. Not all components are necessary, and some components are not shown because of their conventional nature as would be known by one skilled in the art. Selected logical connections are labeled as reference numerals 140-162. Operating environment 100 is merely one example of an illustrative operating environment suitable for practicing the present invention.

Agent 112 is typically a human being but could be an electronic solution (such as a voice/speech translator). Currently, human beings provide the best intermediary between a call initiator and a called party. For call participants that are hard-of-hearing, TTY device 128 offers the ability to communicate visually. Agent 112 listens to a caller and then types a corresponding message to be received on TTY device 128. Agent 112 also reads text received via TTY device 128 (or via the Internet) and orally communicates the typed words to the other call participant.

Switching environment 113 is preferably a VoIP switching environment. An exemplary switching environment 113 suitable for use in connection with an embodiment of the present invention is the NXi Telephony Services (NTS) tool offered by NXi Communications of Salt Lake City, Utah.

Internet gateway 118 allows calls to be received by the system through data network 120. For example, a call can be placed by visiting a website at a specific Internet address and typing in a destination connection number, such as a phone number. A conventional keyboard can be used to type the desired text. This feature, the ability to receive data from networks other than a telephony network, is one of the many novel aspects of the present invention. Other gateways can be included to route alternative types of traffic in the manner similar to that of including Internet gateway 118 to route IP traffic. In a preferred embodiment, the system normalizes protocols to a common protocol, such as VoIP, before communicating the call to agents 112 via links 140.

Signaling gateway 122 seamlessly communicates most protocols, including SS7 and C7 data. An exemplary signaling gateway 122 suitable for using in connection with the present invention is the "SIGNALPATH 230 Signaling Gateway" offered by Encore, Inc., of Gardena, Calif. Links 141 preferably communicate from signaling gateway 122 to telephony servers 116 using the ISDN protocol.

DMS 124 receives incoming call requests, communicates the requests to SCP 130, which consults application 134 to determine how to route the call request. Communications link 144 preferably transmits data using SS7 signaling.

Application 134 is preferably a Java-based application and is designed to interface with a communications network to retrieve incoming call information prior to the arrival of the call at one of the telephony servers 116. Application 134 utilizes call information it receives from the network and the call center data it receives from telephony software to feed a Route Script Execution Engine ("RSEE")—which will be discussed in greater detail below with the data to properly determine the appropriate agent for the incoming call.

As previously referred to, FIG. 1A depicts the high-level communication interfaces of a complete routing solution. The present invention is a complete routing solution capable of routing new inbound calls from TTY 128 or voice 126 customers, as well as Internet-based 120 callers.

A standard TTY/Voice call would be routed as follows. First, the call would be initiated by a call initiator from a TTY 128 or standard phone 126. The call would flow throughout DMS 124. Once the call reached DMS 124, it would send a route request to SCP 130. Upon receiving this request, SCP 130 performs a look-up in its routing tables and finds that it needs an address, or route-label, to route the call. SCP 130 would then send a route-request to application 134, which would in turn respond with the appropriate route-label. The request is preferably sent across link 152 to application 134 using the SiteRP protocol. At this point application 134 has the information needed to perform its routing procedures prior to the call arriving at the telephony servers 116, or any other device that routes a call to its destination.

With the route-label provided by application 134, SCP 130 can look-up the appropriate switch/trunk group and respond to DMS 124 with a destination circuit for the call. Once DMS 124 has received the route-response, the call is sent to signaling gateway 122, where the message is converted from SS7 to ISDN in a preferred embodiment and passed to a telephony server 116, Upon ring detect at the telephony server 116 (or whatever device is used in its stead), the requirements associated with Average Speed of Answer (ASA) begin. Upon answering the inbound call, telephony server 116 will send a route-request through call processor 114 to application 134. Application 134 will then return the agent ID of the agent preassigned to the call by RSEE 134G (discussed below). After the route-response is received, the call will be delivered to the specified agent, thereby completing the routing process and ending the ASA calculation.

As previously mentioned, application 134 also provides routing for call transfers and nonstandard call modes such as Internet communications. These additional route-request processes follow the same standard request path, but they are initiated by different components.

In the case of an Internet call, the route-request would be initiated by an inbound Internet caller. This communication path would flow through Internet gateway 118 to call processor 114, where it would follow the previously described path for retrieving the agent ID from application 134 and delivering the call to the specified agent 112. Call transfers are slightly different, but follow the same path. If an agent 112 requests to transfer an inbound/outbound call to another agent, the transfer request is sent to call processor 114 where it requests the appropriate agent ID from application 134 and performs the call transfer. The only difference between these two routing requests and standard TTY/Voice requests are that the agent ID is not determined prior to the call reaching the platform. This is because the call is already on the platform. Application 134 is not limited to these two additional route-request types. The architectural design of the package lends itself to routing any call modality supported by the switches of a corresponding communications network.

Application 134 includes a set of communication interfaces and processing engines that feed and drive the call route decision-making process. In a preferred embodiment, Java 1.4 programming API is employed with low-level interfaces that provide communication links with a communications network and other distributed computing environments. Application 134 provides management capabilities that allow the system to be configured remotely and provides a graphical scripting environment 135 that makes call-routing easier and less resource intensive.

In addition to providing a flexible and manageable routing package, application 134 package is scalable enough to grow as demand for call-routing demands grow and robust enough to adhere to the strict survivability requirements set by regulatory agencies or third parties by contract. Application 134 is designed to communicate with 'N' number of deployments of the software throughout a communications network. With this robust design, ('N'−1) deployments could be lost and the platform would survive without a major outage. This feature will be discussed in greater detail below.

Figure 1B:
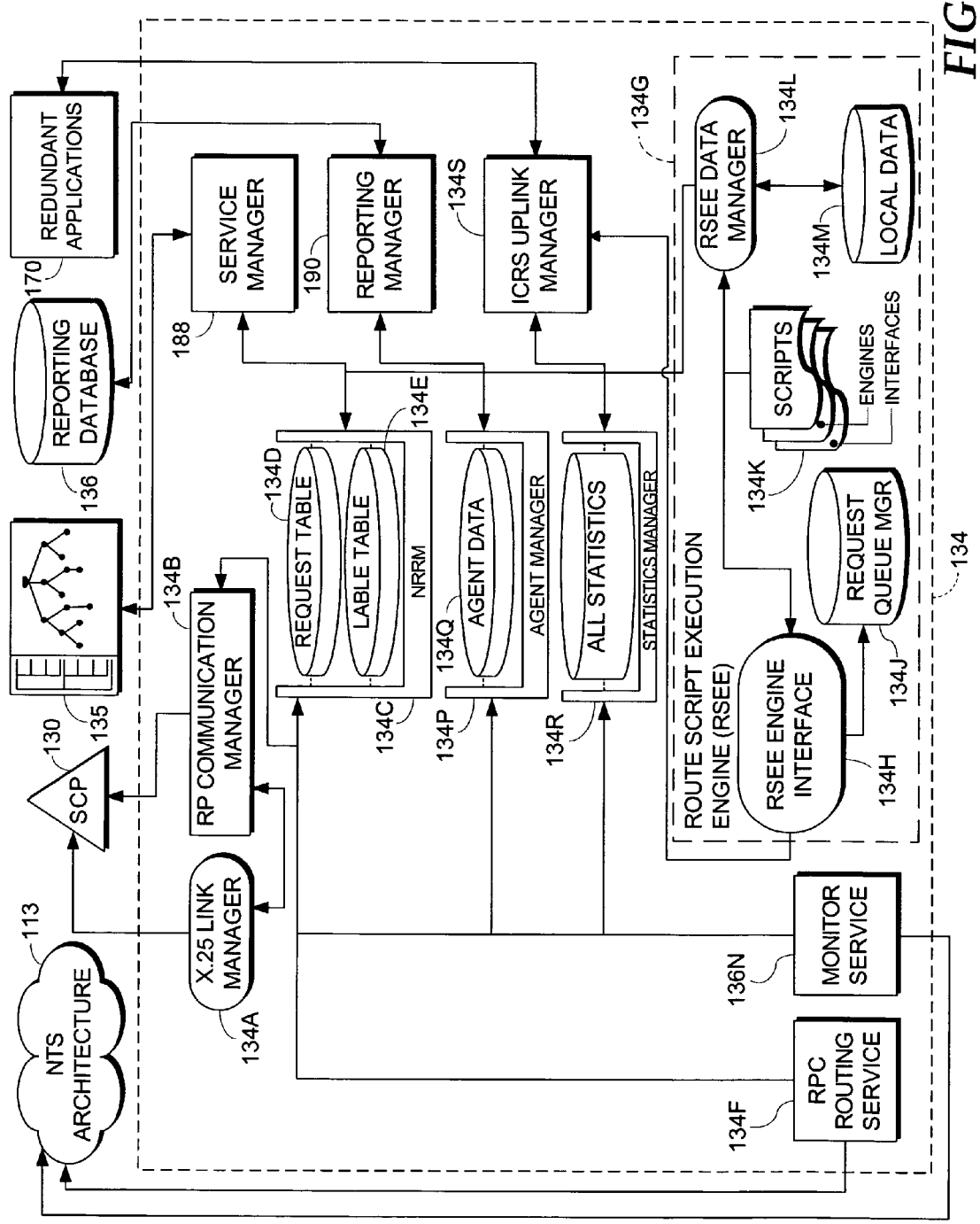
FIG. 1B depicts an illustrative representation of the components that compose an exemplary architecture of application 134 of FIG. 1A.

Application 134 provides multiple types of inbound call-routing by acquiring and maintaining certain types of data and statistics to make the appropriate decisions on which agents should facilitate which calls. FIG. 1B depicts the internal processing managers, data storage units, and execution environments that make-up application 134 architecture.

Turning now to FIG. 1B, an exemplary architecture for application 134 is provided in the dashed box along with its communication with other illustrative components. The architecture shown in FIG. 1B is an exemplary architecture of application 134, but its composition should not be construed as limiting in nature. The names of the various components are provided for referential purposes. Other components that accomplish similar functionality may be known in the art by other names.

A Link Manager 134A, preferably an X.25 Link Manager, maintains X.25 links between application 134 and each SCP 130 it is connected to. Link Manager 134A uses a core C++ toolkit wrapped with Java Native Interface (JNI) to provide the needed functionality in one embodiment. A Route Processor Communication Manager (RPCM) 134B uses Link manager 134S 134A, which is responsible for performing all communications with the connecting SCPs 130. RPCM 134B provides an interface for a Network Route Request Manager (NRRM) 134C (which includes a request table 134D and a label table 134E) to send and receive SiteRP-formatted messages to the connecting SCPs 130. NRRM 134C responds to all inbound route-requests in a specified time, preferably within 900 milliseconds.

NRRM 134C also coordinates the execution of all scripts to determine the proper agent for the specified route-request. For example; when a route-request is received by RPCM 134B, it immediately notifies NRRM 134C, which will immediately start a timer, add the request to the request table, start an execution thread, determine an appropriate route-label, and wait for the expiration of the timer. Upon expiration of the timer, NRRM 134C will instruct RPCM 134B to send a route-response message to SCP 130, specifying the appropriate route-label. Additional information on the communications between application 134 and SCP 130 can be found towards the end of this disclosure under the heading "Enhanced SiteRP Application Protocol."

An RPC Routing Service 134F. The RPC Routing Service 134F is an XML-RPC engine designed to provide a communication point with the switching environment 113. This communication point will be used by the switching environment 113 to allow call processor 114 to make route-requests. When a route-request is received, the RPC Routing Service 134F communicates with NRRM 134C to retrieve an assigned agent ID from request table 134D and return it to the requesting respective call processor 114. In a preferred embodiment, two types of requests will be processed by application 134. The first is a prerouted request that provides an Info Digit, DNIS, and ANI. The second is a postroute request, which includes an array of parameters to be provided to a RSEE 134G for a routing decision. RSEE 134G includes a RSEE interface 134K, a request queue manager 134J, a group of scripts 134K (which preferably include respective engines and interfaces), a RSEE data manager 134L, and a reservoir for local data 134M. In each scenario, application 134 will respond with the specified agent ID, identifying the agent to which the call should be routed.

A monitoring service 136N interfaces with the switching environment 113 to monitor XML data stream 162 to retrieve agent/staffing and port-capacity information. This information feeds the data used throughout application 134 to make routing decisions. Components that receive this information (customers) include an agent manager 134P (which stores agent data 134Q including status and profiles), statistics manager 134R (which continually updates and stores call-routing and agent statistics), an uplink manager 134S, and RSEE 134G (which manages the execution of all route scripts and the associated queuing engines).

Due to desirable survivability attributes of this architectural component, uplink manager 134S provides an Inter-Process Communication (IPC) feature that allows it to communicate with 'n' number of redundant application 134 implementations 170. Uplink manager 134S sends and receives event notifications with redundant applications 170 to ensure no duplicate route assignments are made, which is especially important when all linked application 134s are responsible for the same agent pool 110. Incident to reserving an agent for a specific call, RSEE 134G will notify uplink manager 134S of the event and the event will be broadcast to all linked applications where the respective uplink manager 134S will receive the event and notify all registered components within the implementation.

Registered components include NRRM 134C, Agent Manager 134P, Statistics Manager 134R, and RSEE 134G. NRRM 134C is notified so it can confirm whether the agent assigned is assigned to one of its route requests. If so, NRRM 134C sends the request back through RSEE 134G again for another agent assignment. Agent Manager 134P is notified to update its agent-status list. Statistics Manager 134R is notified to update its agent statistics and RSEE 134G is notified to update its Select Engines.

Route Script Execution Engine (RSEE)

Briefly mentioned above, RSEE 134G is a processing engine designed to accept route-requests that contain call/transfer information and to execute a user-defined route script 134K in a preferred embodiment. The route script uses this information to determine the proper agent to reserve for the route-request. As route-requests are received they are assigned separate processing threads called Execution Environments (EE). Each EE has the capability of utilizing two types of data to make decisions throughout the execution of the route script 134K. The present invention uses local and global data.

Local data includes user-defined, route-request provided, and system-defined variables that are only accessible to the EE. Examples of local data include; DNIS, ANI, H, caller preferences, etc. Local data is tied to the call/route-request being processed. Global data is relevant to all calls/route-requests being processed in the system. Subsequently, global data can be accessed from anywhere within RSEE 134G and server 132. Examples of global data include; percent of calls handled by a particular center, number of agents available with a particular skill-set, and the like.

RSEE 134G is responsible for maintaining all available route scripts 134K and provides an interface to the data engines within the scripts themselves. As different components transmit event messages within application 134, RSEE 134G will pass pertinent information on to the data engines for real-time accurate routing of calls.

A route script 134G is a compiled set of instructions that can be executed by RSEE 134G to determine a route destination for the specified call. At a lower level, the route script 134K is a set of linked instruction modules that utilize user-defined formulas and real-time data to select the appropriate agent for each call. There are several instruction modules available to an administrator that provide the capability of creating a route script 134G. A portion of these modules are listed in Table A.

TABLE A

Route Script 134G Instruction Modules

| Module Name | Visual | Description |
|---|---|---|
| IF | Diamond | Evaluates a user-defined expression and chooses the TRUE or FALSE route based upon the outcome. |

TABLE A-continued

Route Script 134G Instruction Modules

| Module Name | Visual | Description |
|---|---|---|
| SELECT | Rectangle | Based on the local/global data available, maintains a list of agents that meet the specified characteristics. Reserves an agent based on the selected predefined algorithm. |
| SWITCH | Parallelogram | Evaluates a user-defined expression and chooses the path whose value equals the result of the expression. If none match, the default route is chosen. |
| DISTRIBUTE | Triangle | Uses user-defined configuration and algorithms to determine the appropriate route to select. (Percent Allocation, Time of Day, Day of Week) |
| START | Circle | Signifies the start of the script. Allows for parameter input. |
| JUMP | Square | Instructs RSEE 134G to take all local data and start executing the specified route script. |
| SET | Pentagon | Instructs RSEE 134G to set the value of a specific global or local variable. |
| END | Octagon | Signifies the end of the route script and instructs RSEE 134G to take the user-defined prior to completion. |

The graphical route-scripting environment 135 provides easy modification of scripts to reroute data in real time and will be discussed in greater detail below.

Within the route-scripting environment there is a set of instruction modules that provide RSEE 134G with the instructions to perform agent selection. Each instruction module preferably has three parts, a runtime execution class, a graphical representation of this class, and an XML configuration for the component. Each instruction module performs two actions in a preferred embodiment. The first action being a defined operation that performs some type of data evaluation or definition to determine the next operation in the execution of the script or agent selection. The second action instructs RSEE 134G to actually execute the decision-defined next operation or end execution. Instruction modules will be associated with each other by clicking and dragging a link to the next action node.

The IF module provides the user with one of the simplest forms of decision making in the entire scripting language. This module allows the user two different modes of operation. The IF module can evaluate a user-defined expression to either true or false and associate a next action node with each. The module can also evaluate an expression and search for the result in a user-defined list of values and route based on if the value is found in the list or not. In each scenario the module will route in one of two directions.

Figure 2:
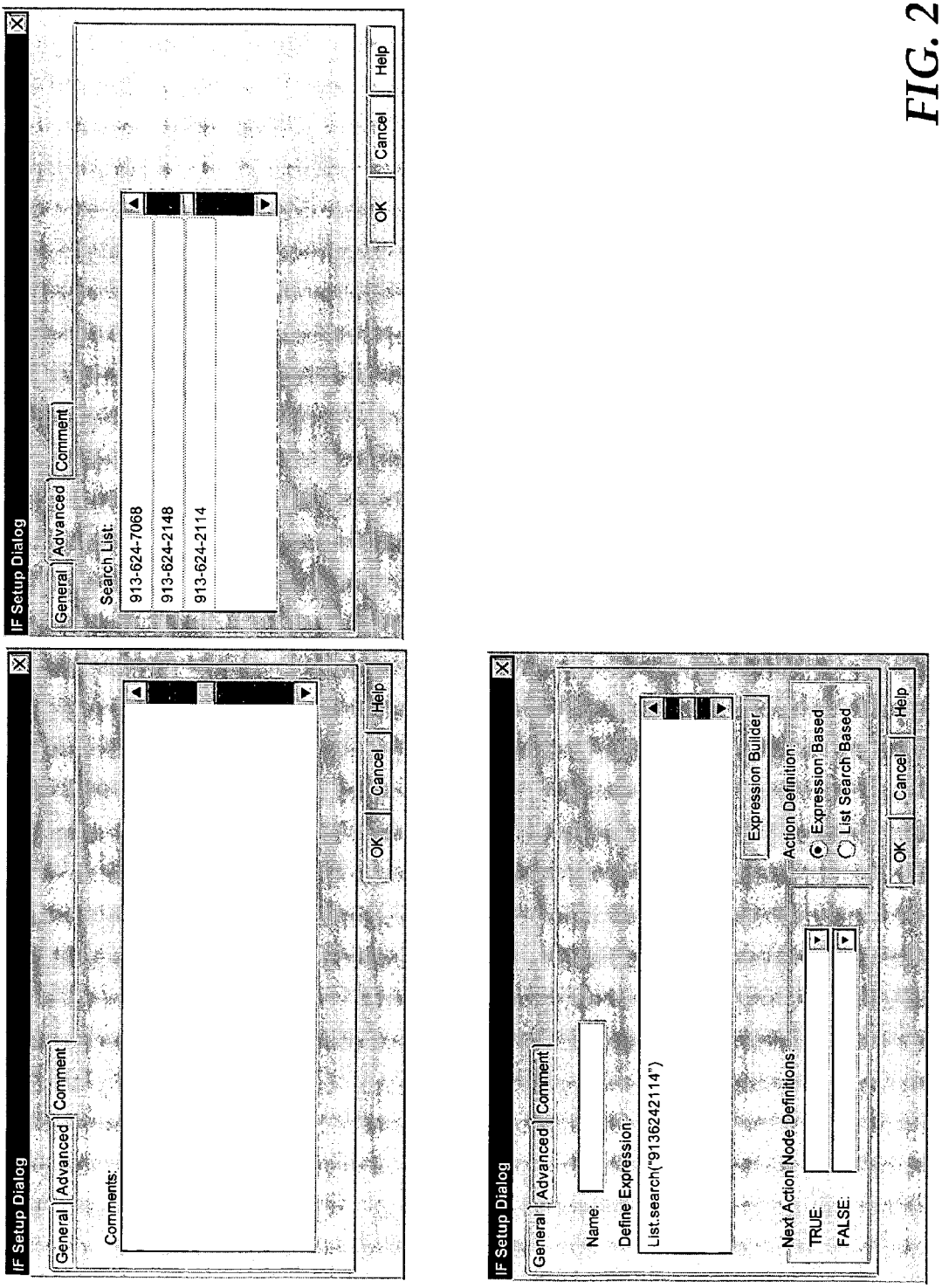
FIG. 2 provides three illustrative screenshots of an exemplary graphical representation of the setup dialog for the IF module in accordance with an embodiment of the present invention.

FIG. 2 provides three screenshots of an exemplary graphical representation of the setup dialog for the <IF> module. The dialog shows that there are three tabs representing general, advanced, and comment information. The General tab provides the user with the ability to name the module within the script. The TextArea in the center of the tab allows the user to provide an expression that will be evaluated at runtime. If the user does not wish to build the expression manually, he or she may click on the Expression Builder button for help with this operation. The two combo-boxes in the bottom left corner of the tab allow the user to assign next action nodes to both a true and false evaluation. The Action Definition section of the tab allows the user to select the mode of operation for the module. The first selection indicates that the expression will be evaluated to a true or false value. The second selection indicates that the expression will be evaluated to an alpha-numeric value and searched for in the list specified on the Advanced tab.

The Advanced tab provides the user with a list of values to be searched in a List Search Based mode of operation. This list can be modified by the user to include any alpha-numeric values. The Comment tab simply provides a TextArea that allows the user to document anything that they feel is pertinent to the configuration of the module. This tab is provided on each and every dialog and will not be discussed further in this document.

The SWITCH module is designed to evaluate a user-defined expression and compare the outcome of the expression to the user-defined options in the module's list. Each user-defined option will have a next action node associated with it. If the module evaluates the expression and finds a match in the user-defined options it will instruct RSEE 134G to execute the associated next action node. If the module does not find a match in the user-defined options it will instruct RSEE 134G to execute the user-defined default next action node and continue. The graphical representation of the SWITCH module will be displayed as a triangle.

Figure 3:
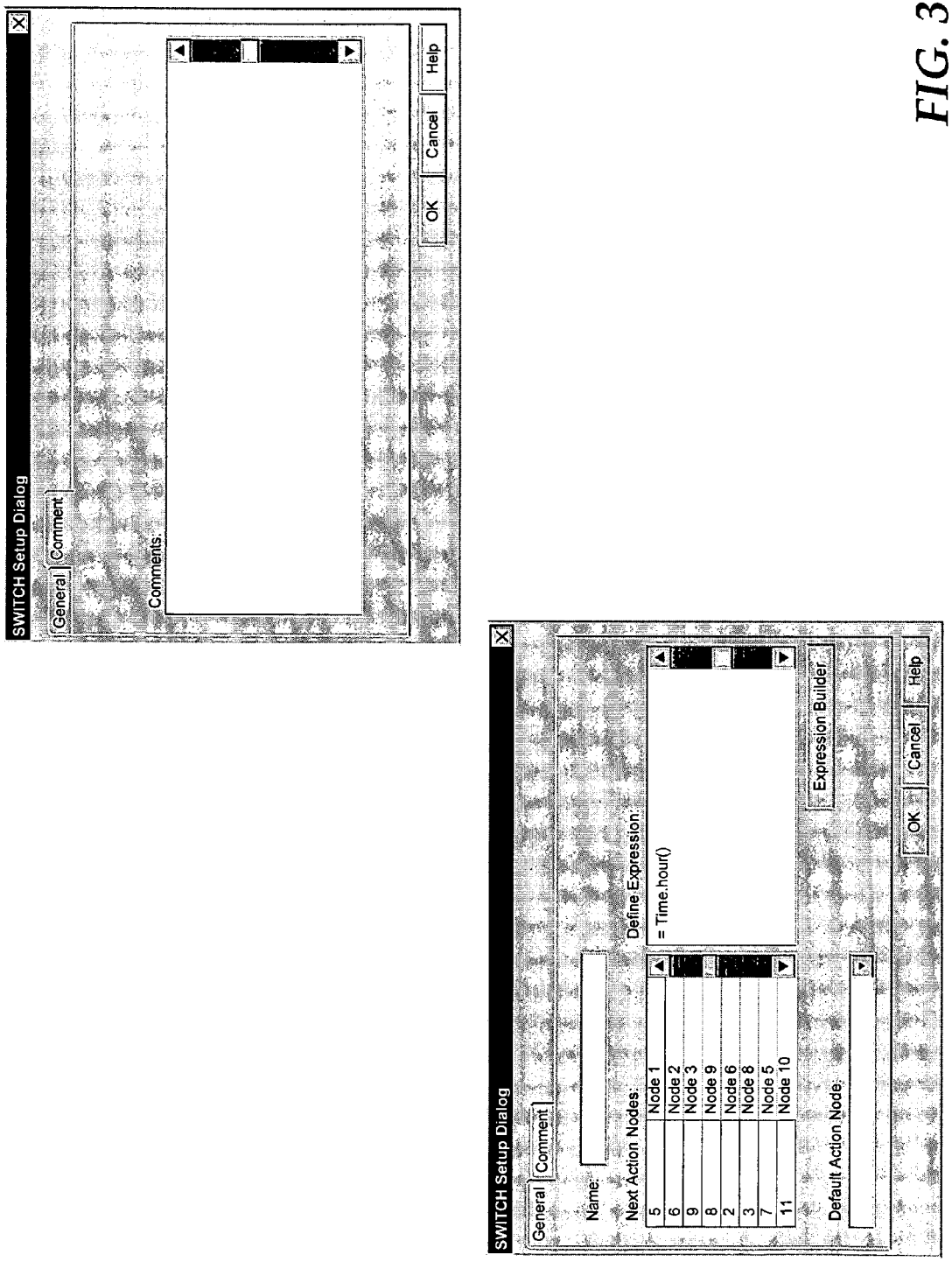
FIG. 3 depicts two illustrative screenshots associated with the SWITCH module in accordance with an embodiment of the present invention.

FIG. 3 depicts two screenshots associated with the SWITCH module. The dialog provides the standard name field, found in every dialog in the scripting interface. Below the name field is a table of next action nodes and their associated values. When the SWITCH module completes its execution of the user-defined expression, a resulting value is determined. Upon this determination, the SWITCH module will search for the value in this user-defined list. If a match is found the module will direct the Execution Environment [EE] to the next action node specified in the table. If no match is found, the SWITCH module will direct the EE to the next action node specified in the Default Action Node field. The Default Action Node field will be populated with a list of all nodes found in the specified script. The final field found on the SWITCH module Setup dialog is the Expression field, which mirrors that of the IF module's Expression field. This field defines the expression that drives the execution of the decision module.

Figure 4:
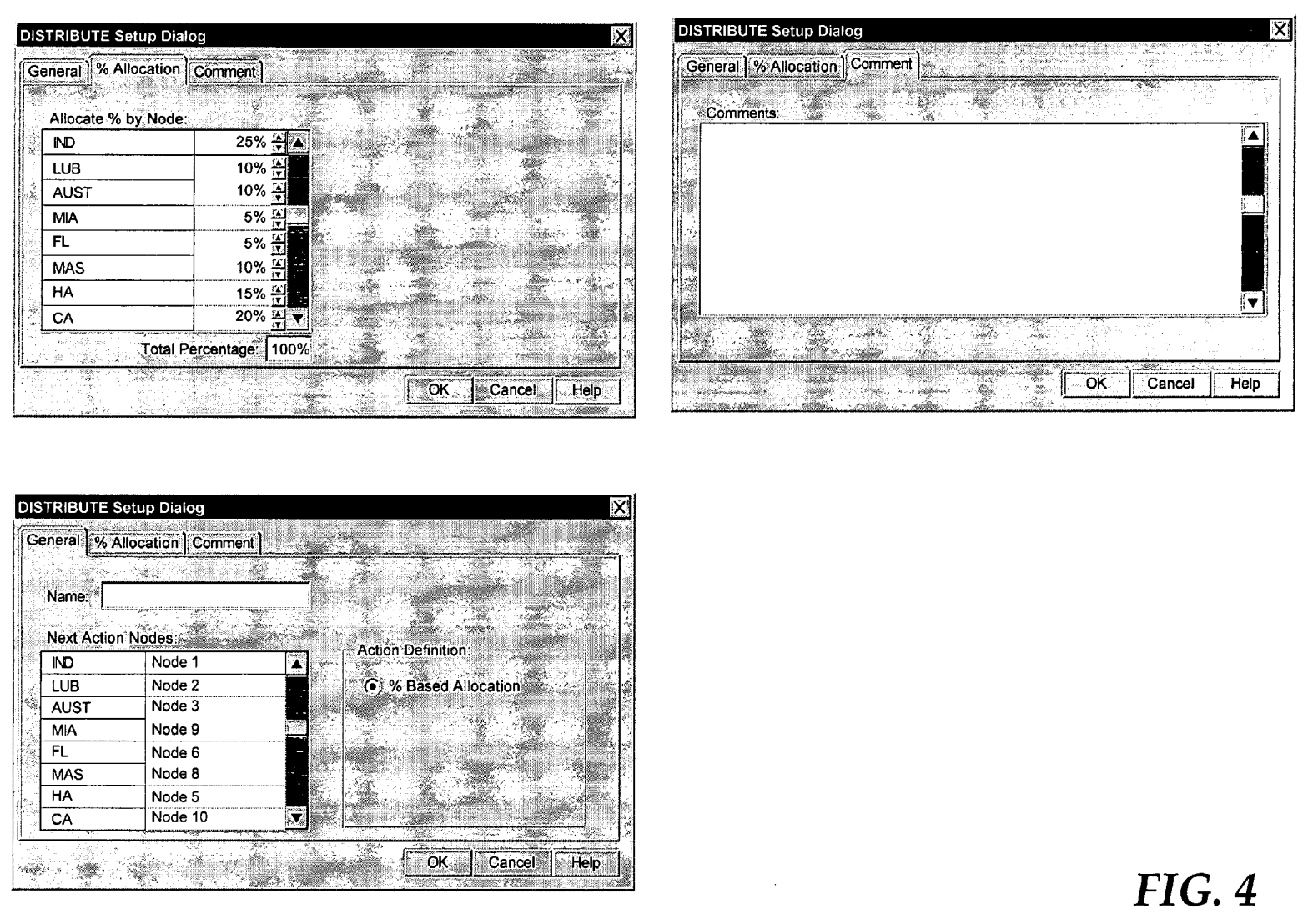

FIG. 4 depicts three screenshots associated with the DISTRIBUTE module in accordance with an embodiment of the present invention. The DISTRIBUTE module is designed to distribute requests to a user-specified set of next execution nodes based upon the selected algorithm. The present invention includes a percent-allocation algorithm for request distributions. The percent-allocation algorithm allows an administrator to define the percentages of total volume that each next action node will receive and routes based upon this. The graphical representation of the DISTRIBUTE module is displayed as a parallelogram in the preferred embodiment.

The DISTRIBUTE module Setup dialog provides three tabbed panes (General, Percent Allocation, and Comment). The General pane allows the user to define allocation points by name and associate next action nodes with each of the defined allocation points. The name of the allocation points are immaterial to the rest of the script, but cannot be duplicated within a single DISTRIBUTE module. The percent allocation pane allows the user to define the percentage of traffic that each allocation point will receive. The total percentage of all allocation points must equal 100 percent and will not be processed until this constraint is met. The DISTRIBUTE module Setup dialog allows for the integration of additional algorithms without redesign. As additional algorithms are added to the dialog they will be added to the radio button options on the General pane.

Figure 5:
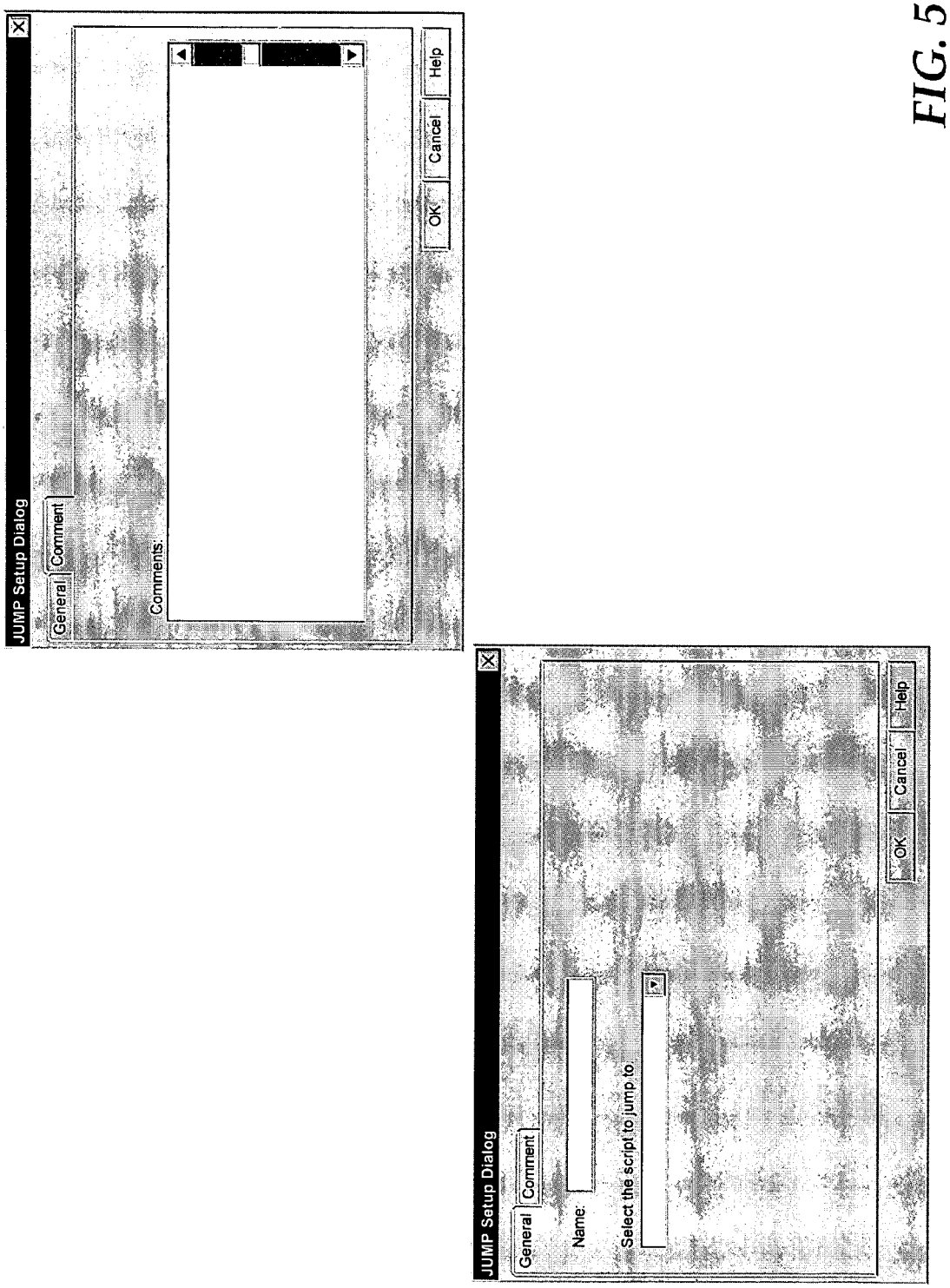
FIG. 5 depicts two illustrative screenshots associated with the JUMP module in accordance with an embodiment of the present invention.

FIG. 5 depicts two screenshots associated with the JUMP module in accordance with an embodiment of the present invention. The JUMP module is designed to allow the administrator to script the capability to instruct RSEE 134G to leave the current script and run a different script. The graphical representation of the JUMP module will be displayed as a square. The JUMP module provides the user with the ability to name the module and select the script to be executed next. The script field will be auto-populated with all available scripts found in RSEE 134G upon creation. Additional scripts can be manually entered.

Figure 6:
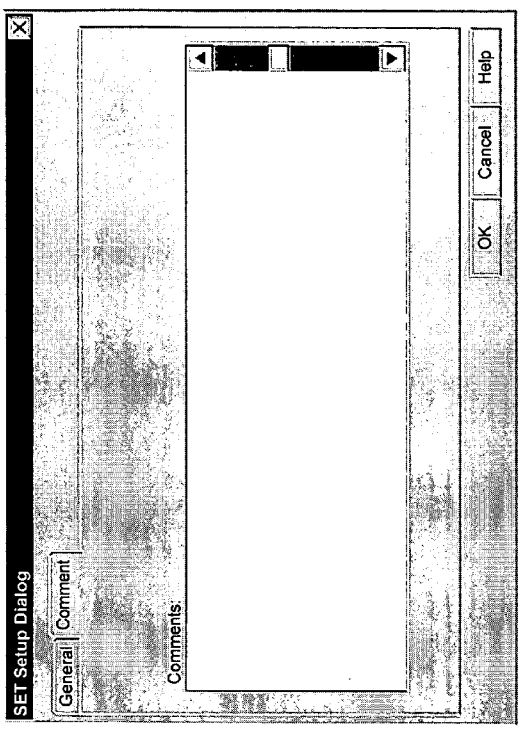
FIG. 6 depicts two illustrative screenshots associated with the SET module in accordance with an embodiment of the present invention.
Figure 6:
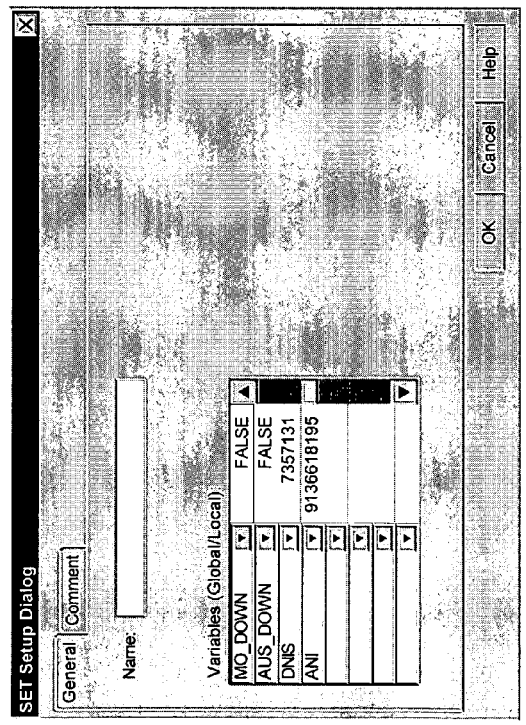

FIG. 6 depicts two screenshots associated with the SET module in accordance with an embodiment of the present invention. The SET module is designed to provide the administrator with the ability to set local and global variables within RSEE 134G environment and instruct RSEE 134G to execute the user-defined next action node. The graphical representation of the SET module will be displayed as a pentagon. The SET module Setup Dialog allows the user to set local and global variables. The table on the General pane allows the user to select the variable to be set in the left column and to set the value in the right column.

Figure 7:
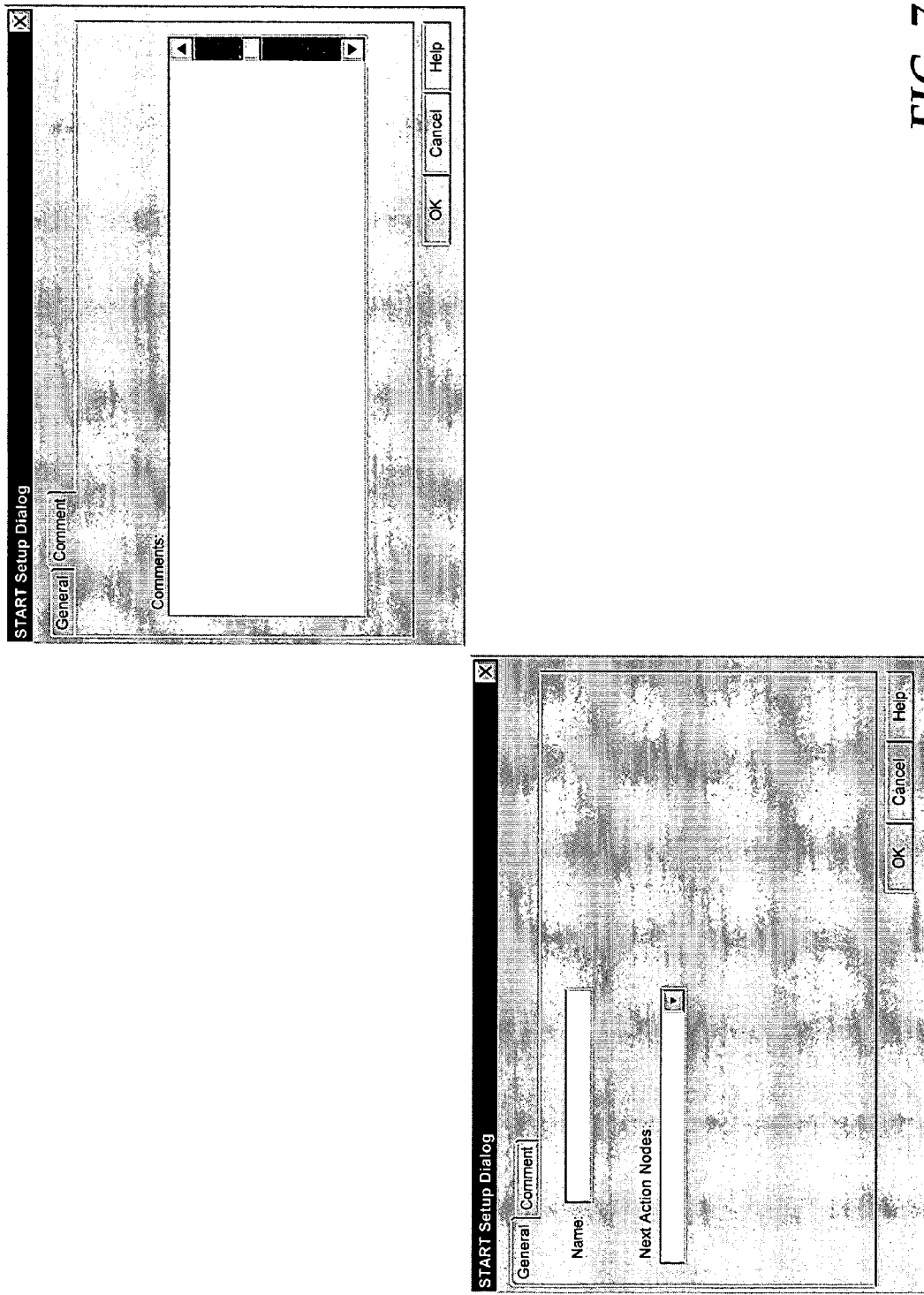
FIG. 7 depicts two illustrative screenshots associated with the START module in accordance with an embodiment of the present invention.

FIG. 7 depicts two screenshots associated with the START module in accordance with an embodiment of the present invention. The START module signifies the start of the script and the user-defined next action node. The graphical representation of the START module will be displayed as a circle. The START module Setup dialog allows the user to define the next action node that the EE should execute to begin execution of the script. The primary use of the START module is to signify the beginning of a route script 134G.

Figure 8:
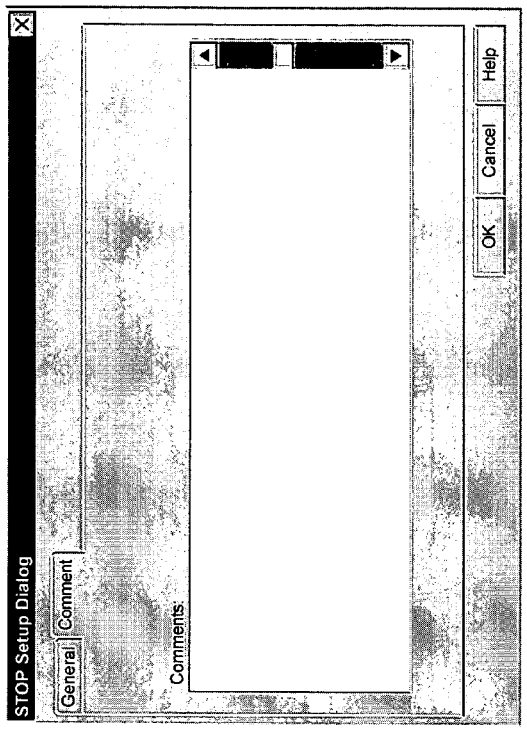
FIG. 8 depicts two illustrative screenshots associated with the STOP module in accordance with an embodiment of the present invention.
Figure 8:
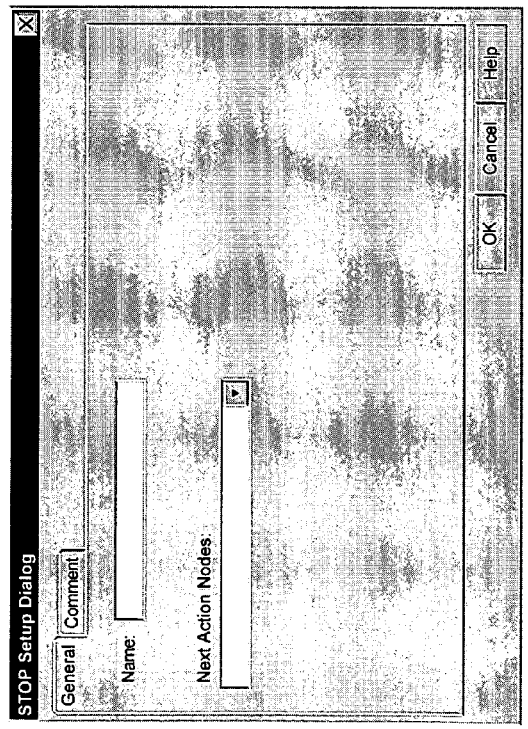

FIG. 8 depicts two screenshots associated with the STOP module in accordance with an embodiment of the present invention. The STOP module signifies the end of the script execution. Each STOP module contains a final action node to be executed by RSEE 134G. A final action node cannot be used to execute another instruction module in the preferred embodiment of the present invention. Rather, it is a pre-defined script ending action. These include execution of another script, or call hang-up. The graphical representation of the STOP module will be displayed as an octagon.

Figure 9:
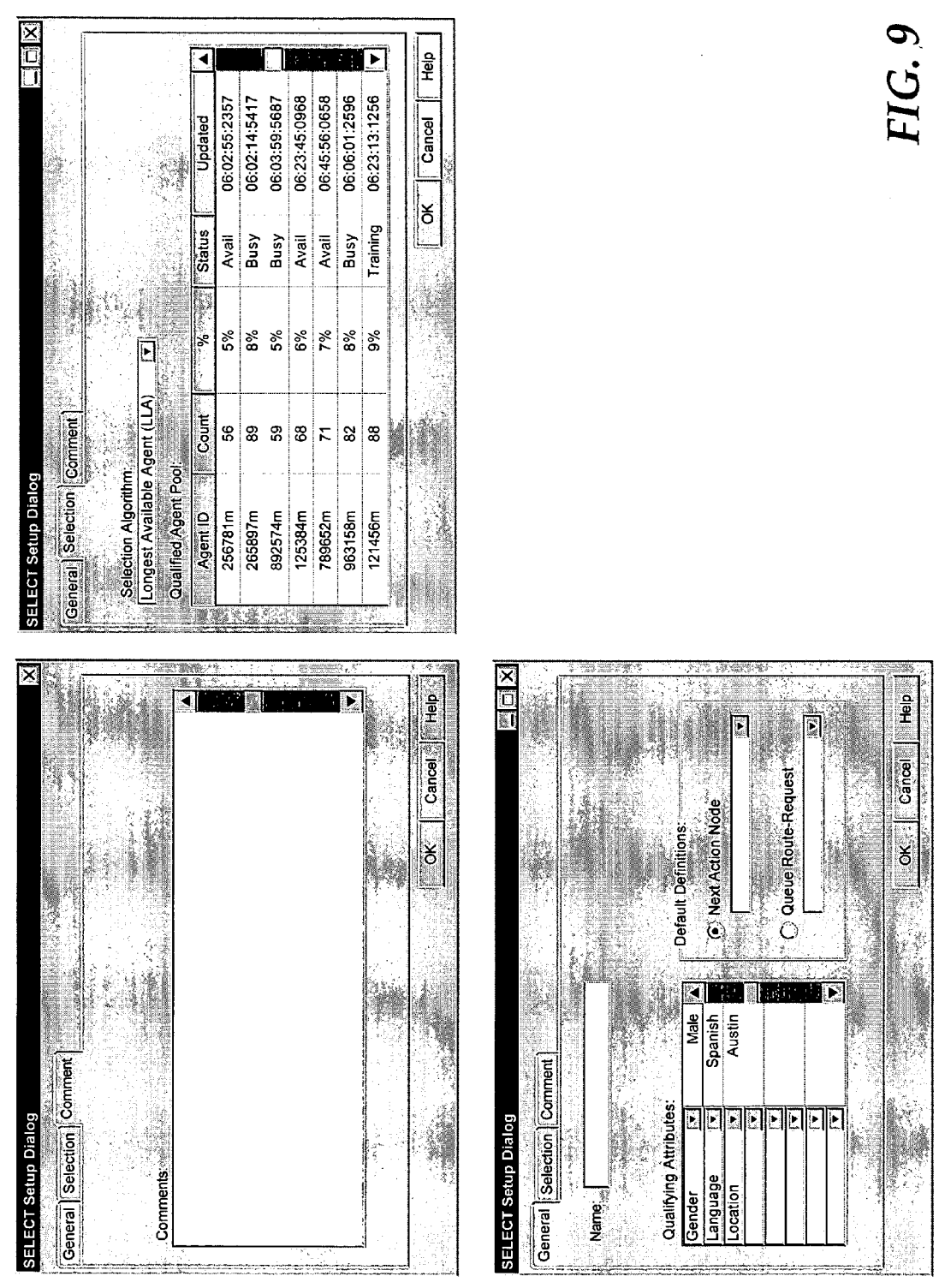

FIG. 9 depicts three screenshots associated with the SELECT module in accordance with an embodiment of the present invention. The SELECT module is by far the most complicated instruction module of the entire Scripting language. The SELECT module is designed to perform one of two functions. It can select an agent based on the specified set of attributes set by the logic within the route script. The module can also be configured to select a user-defined queue. If the module is configured to select a specific agent, it will do so based upon the Longest Available Agent (LLA) algorithm in a preferred embodiment. This selects the agent who has been idle the longest. In this scenario the module will also allow the administrator to define a default next action node for situations where there are no agents available for the module to select. This action can be to proceed with another instruction module or event place the request in a specified queue. If the module is configured to select a user-defined queue to place the request in, it can be configured to use a specific routing algorithm.

A first exemplary algorithm is the Minimum Expected Delay algorithm, which selects the queue with the smallest reported delay. This variable is calculated by finding the average time the last 25 calls spent in queue. The other algorithm is the Minimum Calls In Queue algorithm, which selects the queue with the lowest number of queued requests.

The graphical representation of the SELECT module will be displayed as a rectangle in a preferred embodiment.

The SELECT module Setup dialog, as shown in FIG. 9, has two main tabbed panes (General and Selection). The General pane is used to configure what type of agents the SELECT module will monitor and route calls to. An administrator can define agent attributes required by a call that will be routed to this module. The user can select from any of the pre-determined agent attributes and assign the required value being requested by the call. RSEE 134G will then read these defined values and create a SELECT module that will only route calls to agents with these specific attributes. If the module cannot find an agent that meets the specified requirements, RSEE 134G will then execute the user-defined default routing found in the default-definitions section. The user can specify that in this scenario the EE should move on to the defined next action node or it could specify that the request should be placed in the specified queue.

The second main tabbed pane of the SELECT module Setup dialog provides two major features. The first is the capability of selecting the different selection algorithm to be used to select the appropriate agent from the maintained list. The second feature is the agent pool data view it provides. FIG. 9 shows the table on the Selection tab and the information that it displays. During processing of route requests the SELECT module maintains a list of agents that meet the specified attribute values requested by the user and the caller. This list is represented in the dialog for the module and is continually updated to show the current status of the routing environment. This allows the administrator an up-to-date view of the routing for this particular SELECT module. The data displayed in this table include the AgentID of the agent, amount of calls routed to the agent by this SELECT module, percentage of this SELECT module's calls that is has taken, the current status of the agent, and the last time their status changed.

The Expression Builder is a graphical component that provides an administrator with a tool for creating the expressions used within each of the components. The Expression Builder will provide the administrator with a text pane for creating and modifying expressions. A list of local and global variables available within the route script 134K can be provided for easy use. Operator and function buttons will be added to enhance the development environment.

The expressions created within the Expression Builder will be validated and returned to the route script 134K as a configuration component. The Expression Builder will be accessible within any instruction module's dialog where an expression is either optional or required for the instruction module's execution.

Figure 10B:
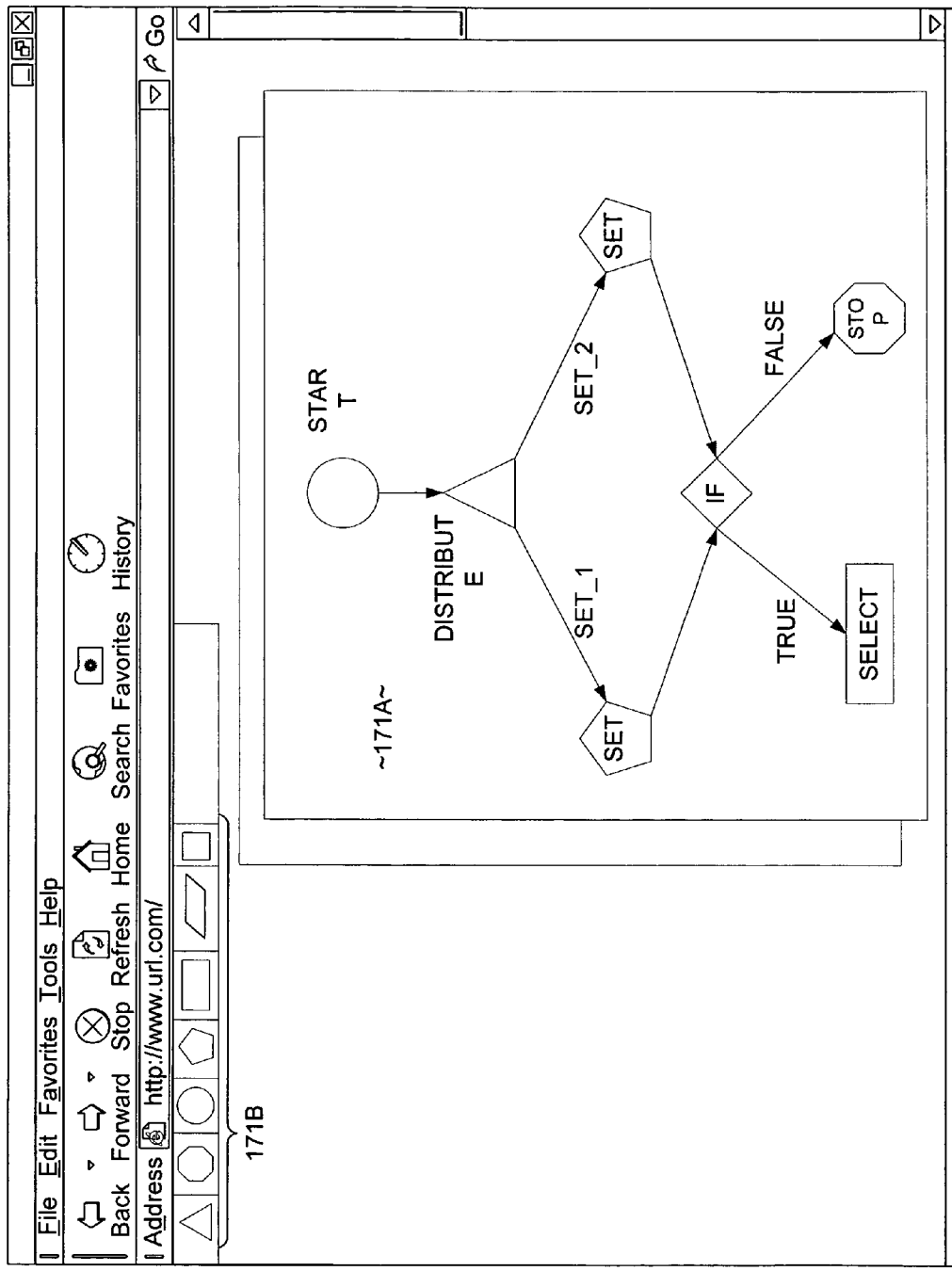
FIG. 10B provides an illustrative implementation of graphical call-route scripting interface in accordance with an embodiment of the present invention.

A summary of exemplary symbols used in the graphical call-route scripting interface 135 are provided in FIG. 10A. FIG. 10A illustrates the various symbols that serve as programmatic code representations. FIG. 10B provides an illustrative implementation of graphical call-route scripting interface 135 and is referenced generally by the numeral 171. As shown, the interface 171 preferably includes one or more canvases 171A and a set of graphical objects (reference symbols) 171B. The relationship of the graphical objects translates to computer code, such as XML, code in a preferred embodiment that compose call-routing scripts, which dictate how calls should be routed. As described above, manipulating the arrangement of the symbols in FIG. 10B translates to a modification of corresponding XML code, which in turn updates routing scripts 134K and redirects call-routing.

Returning now to a continued explanation of the functionality offered by the RSEE, when RSEE 134G begins executing a route script it provides the data received from an SCP 130 inquiry message to the script 134K and executes the next instruction module specified by the current instruction module. Each instruction module processed by RSEE 134G defines the configuration and functionality of itself as well as the next module to process, except in the case of the SELECT and TOP modules, where they possibly conclude the execution of the route script.

One of the major features provided by the route script object is the SELECT engine. The SELECT engine is designed to maintain a list of agents that meet the criteria specified by the user-defined logic in the script. Because this data changes often, the SELECT engine is designed to receive event messages, make modifications to its list, and reserve agents for calls concurrently. The SELECT engine will receive events for at least the following circumstances; agent login, agent logout, and agent status change. These events may modify the list maintained by the SELECT engine.

Another feature that RSEE 134G provides is the capability to queue route-requests until an agent with the appropriate attributes becomes available. The present invention allows the administrator to create and manage as many queues as needed to manage the flow of calls. Each queue is designed to manage a list of agents based on a specific set of attributes needed for the inbound route-requests. The queues also provide the administrator with the ability to configure the queue to perform within the standards of the desired flow of calls. The queue provides the administrator with the following configuration variables; maximum amount of queued requests, maximum amount of time a request can be queued, and the next action node to direct the request to if any of the internal constraints for the queue are not met.

Along with managing and buffering the route-requests within the queuing mechanism, a route request queue must listen for event notifications from other components such as NRRM 134C and uplink manager 134S. These event notifications will make the queue aware of agent status changes as well as notify it when calls need to be removed from the queue due to timeouts and hang-ups. To accomplish this, each queue is registered to the standard messaging backbone as are all the other components within application 134. A route-request queue can be a SELECT engine with a FIFO buffer for route-requests to fulfill.

Monitor Service

As briefly mentioned above, Monitor Service 136N is an extension of the application environment and provides a continuous feed of agent login/status and port capacity event as well as an interface into call data and agent data 134Q. This information is used to drive the majority of the call-routing decisions made within application 134. Monitor Service 136N implements an XML data stream socket to receive and parse the incoming events and distribute them among the many application services in a preferred embodiment.

Monitor Service 136N provides an event-processing service that allows other services within the application 134 package to register themselves to receive specific types of events. This allows the individual services to filter the events to reduce the administrative overhead of the software. Monitor Service 136N also provides an interface that allows internal services to send data queries to the switching environment 113 to retrieve pertinent pieces of information.

Monitor Service 136N is also responsible for monitoring the XML data stream 162 (FIG. 1A) to determine port capacity within the architecture. Monitor Service 136N monitors this channel for any notifications that would modify the status of any of the ports application 134 is configured to monitor.

Upon receipt of status notifications on the specified ports, Monitor Service 136N notifies Statistics Manager 134R of the change for storage and decision making. Additional information will be provided on this functionality in the NRRM section of this disclosure.

RPC Routing Service

RPC Routing Service 134F is another extension of the software environment that provides an interface to transmit route-requests to application 134. This service will implement an XML-RPC interface 160 that allows the application 134 to send route-requests and receive route-responses.

In a preferred embodiment, application 134 responds to two different types of route-request commands: a preplatform and a postplatform route-request. The preplatform route-request is a route-request that the switch environment 113 software sends to application 134 when it receives a call on telephony server 116. In this scenario application 134 has already received the call information from SCP 130 in the form of an "EnhanCED Inquiry" and the process of agent selection has been started and is probably close to completion. The postplatform route-request is designed to provide a method of requesting call-routing for calls that come in through different methods such as via data network 120, the Internet, and the like, or in call transfer situations.

Preplatform route-requests use signaling data to help route calls. Since application 134 is using the ANI, DNIS, and LE fields to uniquely identify the call, this information is passed in the route-request to retrieve an AgentID and call-setup information. The route-request and route-response fields are displayed in Table B and Table C.

TABLE B

Preplatform Route-Request Format

| Field Name | Data Type | Description |
| --- | --- | --- |
| Request Type | N | 01 = PrePlatform Route Request |
| Response Type | N | 01 = Agent ID only.<br>02 = Agent ID + Pref. Routing Info. |
| ANI | X | Calling Number (ANI). Entire field or portions may be blank if not received from the switch. |
| DNIS | X | The toll-free number called.<br>(ZZZ-NXX-XXXX)<br>ZZZ is either 800 or 8888.<br>NXX is from 200 to 999.<br>XXXX is from 0000 to 9999. |
| II | X | Information Digit Pair (II digits). These codes are passed by the switch and conform to the ANI Information Digits Codes assigned by NANPA at the request of the Industry Numbering Committee. |

TABLE C

PostPlatform Route-Request Format

| Field Name | Data Type | Description |
| --- | --- | --- |
| Request Type | N | 02 = PostPlatform Route Request |
| Response Type | N | 01 = Agent ID only.<br>02 = Agent ID + Pref. Routing Info. |
| Param X 'N' | X | Specific requirements to be used in the call-routing decision. Each parameter will be provided in a token/value pair. |

When application 134 receives a preplatform route-request it notifies NRRM 134C to retrieve an AgentID that has been reserved for the call. Application 134 returns the AgentID and customer-preferred-routing information to the calling service if this operation has been completed. If the AgentID has not yet been identified application 134 waits until this determination has been made. Upon receiving the determination from RSEE 134G, NRRM 134C notifies application 134, which in turn responds to the calling service with the appropriate information. This messaging structure allows the calling service to control the timeout value of the route-request. Should application 134 fail to respond within the specified amount of time, the calling service should send application 134 a timeout-notification message. Upon receiving this message, application 134 will instruct NRRM 134C to flag the specified request as having timed out. When RSEE 134G responds to NRRM 134C with the AgentID for the specified request, NRRM 134C will see that it has been flagged as having timed out and place the AgentID back into an available state and delete the route-request.

Link Manager

Link manager 134A and RPCM 134B are designed to work in tandem to provide high-availability communications between application 134 and SCP 130. The main role of link manager 134A is to initialize and maintain the communication link(s) 152 between server 132 and each SCP 130. This includes the configuration of the X.25 lines, data-link-management messaging, and status responses. Any other messaging is passed through link manager 134A to RPCM 134B to be handled.

RPCM 134B is designed to process application-level requests such as Inquiries and "EnhanCED Inquiries." When processing these Inquiries from SCP 130, RPCM 134B must start a request timer, handoff the request to NRRM 134C, request the proper SelectCodeType and SelectCode and then return them to SCP 130 upon expiration of the timer. The timer is designed to notify RPCM 134B when the Inquiry Message is to be transmitted in order to steal as much network time as possible, thereby increasing the amount of time available for script execution. RPCM 134B also provides all other internal services with an interface to send SiteRP messages to SCP 130.

Uplink Manager

Uplink manager 134S provides scalability and survivability to the software package. In a preferred embodiment, uplink manager 134S utilizes Java 2 Platform, Enterprise Edition (J2EE) RMI technology to provide a communication channel between each implementation of application 134 (or 170). If all application implementations will manage the same agent pool 110, uplink manager 134S is responsible for notifying each peer when its RSEE 134G has reserved a specific agent with a reservation message. This message is broadcast to all of its peers. The broadcast also contains the server ID of the reserving server 132. This means that uplink manager 134S is preferably capable of accepting these notification messages as well.

When uplink manager 134S receives a Reservation notification it passes this information on to NRRM 134C, which then instructs Agent Manager 134P to reserve the specified agent. If Agent Manager 134P returns a response that indicates the agent has already been reserved, NRRM 134C then checks its request table 134D to see if it has already reserved the specified agent. If so, NRRM 134C checks the serverID in the Reservation notification against a priority table. If the notifying serverID is higher in priority, then NRRM 134C sends the call back through RSEE 134G to find another agent. If NRRM 134C finds that the notifying serverID is lower in priority, it ignores the message knowing that the notifying server 132 will receive its message and adhere to its superiority. This implementation provides a simple means of avoiding reservation collisions.

Network Route Request Manager (NRRM)

As described above, NRRM 134C is a call manager. NRRM 134C accepts route-requests from RPCM 134B and application 134S, and manages the processing of the specified requests. This includes initial placement in the route-request table 134D, submitting an execution-request to RSEE 134G, storing the responses from RSEE 134G, determining the appropriate SelectCodeType and SelectCode for the Inquiry Response message to SCP 130, acting upon Reservation notifications from peer servers 132, and fielding requests from application 134 for route-response data.

Route-request table 134D, managed by NRRM 134C, contains a record of data for each call currently being processed or waiting to be received. When an "EnhanCED Inquiry" is received by RPCM 134B, it notifies NRRM 134C, which places call source data, such as the ANI, DNIS, and II data, into the route-request table along with a time-stamp and sets the status to "in-progress." These three elements signify the key to the table and will be used for subsequent retrieval. These data elements are passed to RSEE 134G in an execution-request, where they are used to determine the AgentID for the request.

During execution, RSEE 134G queries Customer Preferred Routing Information to retrieve the customer's preferred information (Language Type, Call Type, Communication Mode, Agent Gender, and Update-Inhibit) fields. Upon retrieval, this information is populated into the route-request table 134D as well. Once RSEE 134G has completed the execution of the route script 134K and determined an AgentID, this data is placed in the table 134D along with the request and preference information. At this point, the record is time-stamped and flagged as complete. Table D, below, provides the specification for the route-request table in a preferred embodiment.

TABLE D

Route-Request Table Specification

| Field Name | Field Type | Description |
|---|---|---|
| ANI | Varchar | Calling Number of the calling party. |
| DNIS | Varchar | Toll-Free Number dialed by the calling party. |
| II | Varchar | |
| LangType | Number | Identifies the requested language of the calling party. |
| CallType | Number | Identifies the requested call type (voice, TTY, Internet). |
| CommMode | Number | Identifies the mode of communication (ASCII, Turbo, E-Turbo). |
| AgentGender | Varchar | Identifies the requested gender of the agent. |
| UpdateInhibit | Varchar | Identifies if the agent application can modify this record. |
| AgentID | Varchar | AgentID selected by RSEE 134G. |
| Status | Number | Status of the route-request processing (in-progress, complete, released). |
| Created | Date/Time | Timestamp created when the record is created. |
| Updated | Date/Time | Timestamp created whenever the record is updated. |

The second major responsibility of NRRM 134C is to determine the appropriate SelectCodeType and SelectCode to be returned to the inquiring SCP 130. The SelectCodeType is the action the RP requests that SCP 130 instruct DMS 124 to take upon receiving the Inquiry Response.

Figure 11:
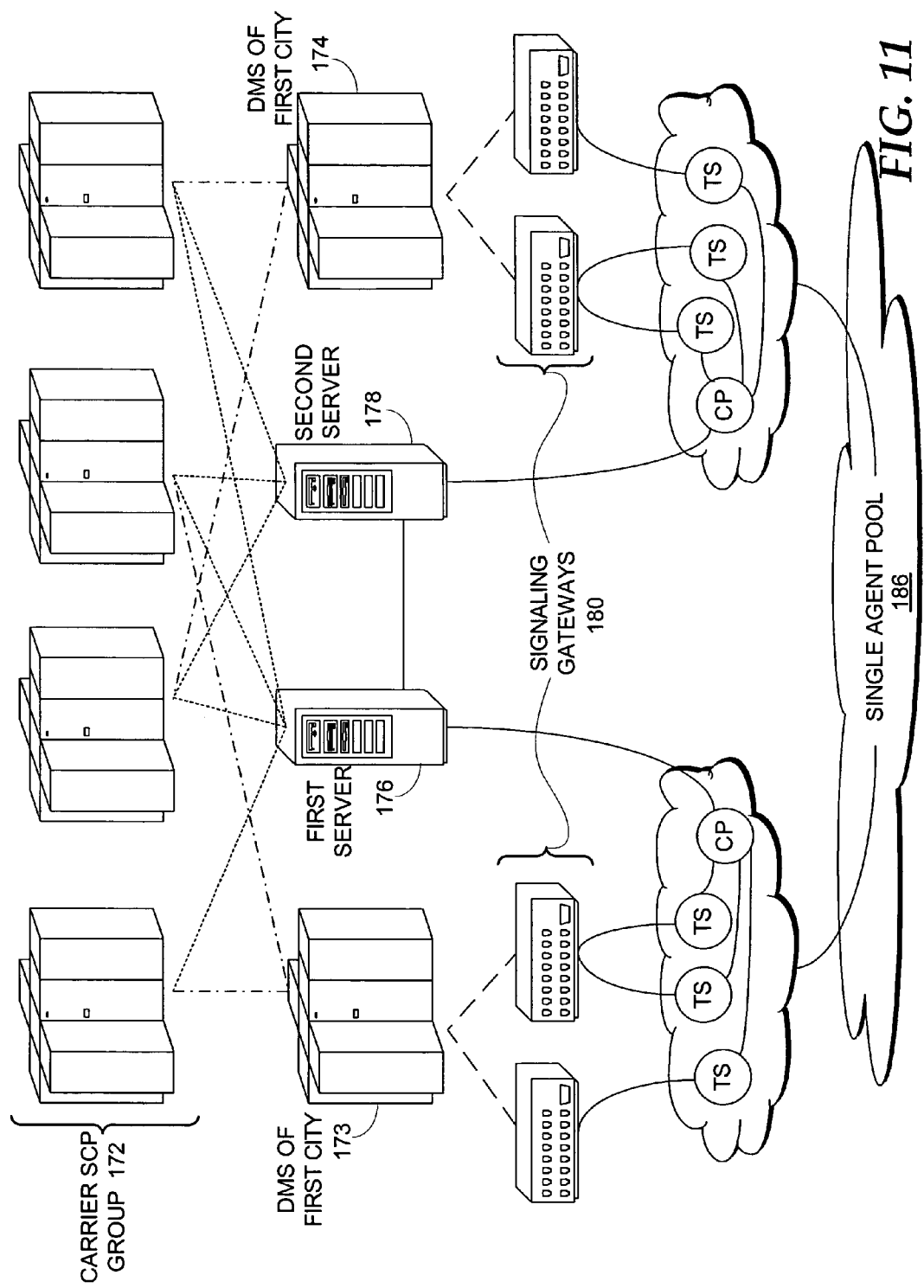
FIG. 11 depicts an illustrative operating environment of a cross-geographic implementation of the present invention in accordance with an embodiment of the present invention.

FIG. 11 depicts an illustrative operating environment of a cross-geographic implementation of the present invention. The SelectCode would be the RP-Label of a specific signaling gateway/protocol converter 180. This is because the respective DMS sees the protocol corresponding protocol converter 180 as the answering ACD. NRRM 134C determines the protocol converter 180 to answer the call.

Application 134 could receive an "EnhanCED Inquiry" from any of four SCPs within SCP group 172, as shown in FIG. 11. Each DMS 172 and 174 is illustratively shown connected to two SCPs. Application 134 does not need to know which DMS from group 172 the "EnhanCED Inquiry" pertains. Due to the nature of the routing architecture, the server does not rely on SCP group 172 to load-balance calls between the protocol converters 180 for entry into the platform. To resolve this issue, NRRM 134C utilizes the port capacity/status data retrieved by application 134 to correctly load-balance the call volume among the protocol converters 180. This functionality also provides network routing survivability because it will know when a protocol converter or any telephony server connected to the protocol converter is in fault status and route calls to the other available ports.

Agent Manager

As described above, =gent manager 134P maintains a listing of the status of every agent logged and their associated attributes. This information drives the reservation of agents for call handling and is contained in the agent-data table 134Q. This table stores the information listed below in Table E in a preferred embodiment of the present invention.

TABLE E

Agent-Data Table Specification

| Field Name | Field Type | Description |
|---|---|---|
| AgentID | Varchar | Agent Identifier. Uniquely identifies the agent in the switching environment 113. |
| Name | Varchar | Full name of the agent. |
| PositionID | Varchar | Actual position ID the agent is currently logged into. |
| Status | Number | Current status of the agent. |
| Attributes | Array { } | Array of attributes possessed by the agent (list). |
| Updated | Date/Time | Date/Time of last status change. |

In a preferred embodiment, as agents login to the system, the Monitor Service 136N will notify Agent Manager 134P, which will then make a call, such as an SQL call, to database 136 to retrieve all profile information for the specified AgentID. Once it has retrieved this information, Agent Manager 134P will insert the agent and its associated profile data into the table. To allow the agent to receive calls, the agent manager notifies RSEE 134G that a new agent has logged in and updates its select engines. Agent Manager 134P also provides an interface into the agent data for services such as the RNNM and RSEE 134G.

Service Manager

Service Manager 188 manages services within application 134. This component provides the ability to configure, start, stop, refresh, and view the status of any service running within the system. The management interface also provides a graphical call-route scripting interface 135 (previously described in detail) that provides an administrator with the capability of creating, editing, modifying and managing a graphical representation of the route scripts 134F used by RSEE 134G. This interface can be made available via a browser, such as a Web browser, and provides a full-featured set of components.

As previously mentioned, the REM will provide the ability to configure, start, stop, refresh and view the status of the following services: Link Manager 134A, RPCM 134B, NRRM 134C, agent manager 134P, report manager 190, Uplink Manager 134S, Server 132, Monitor Service 136N, and RSEE 134G. In addition, the REM will provide graphical scripting engine 135 to allow the administrator to create, edit, and delete route scripts 134K using the route-scripting components identified in Table A.

Statistics Manager

Statistics Manager 134R is a set of engines that continually evaluate data retrieved from Monitor Service 136N, application 134, and Agent Manager 134P to populate global variables used within the present invention. This information includes agent information, port capacities, failure notifications, and performance characteristics of the entire or segmented portions of the present invention. The global variables created and maintained by Statistics Manager 134R are used by three major services. They include RSEE 134G, NRRM 134C, and Reporting Manager 190.

RSEE 134G is the largest user of the statistics calculated by Statistics Manager 134R. The global variables created by the engines are used when executing route scripts within RSEE 134G. Exemplary statistics managed by RSEE 134G in a preferred embodiment are listed in Table F:

TABLE F

Exemplary Statistics Used by the RSEE

| Name | Definition |
|---|---|
| Agent Counts | # of agents logged in (total, per SELECT engine). |
| Queue Counts | # of calls in queue (total, per queue). |
| Call Counts | Total # of inbound calls (route requests) since midnight/every 15 min. |
| Transfer Counts | Total # of transfers since midnight. |
| Queue Times | Length of time in queue, per call. Longest queue time of current calls (per queue). Average Delay in Queue (per queue) since midnight/every 15 min. o = sum(delay time)/# of calls in queue. |
| Service Level | Percent of calls routed within 10 seconds (rolling 15 minute window). |
| Occupancy | Percentage of the agent pool that is in BUSY status. |
| Available Agent Counts | # of agents in available status (per SELECT engine). |
| Avg. Delay in Queue (ADQ) | Rolling average of the delay times for completed route requests for a given queue. |
| Expected Delay in Queue (EXD) | Expected delay for a new call added to a given queue. = (ADQ × (Current # Requests in Q))/(Avg. # Requests in Q) |
| Abandoned Counts | Amount of records in the Requests table with no matching records in the CDR_IN table. |
| Answered Counts | Amount of records in the CDR_IN table since midnight/every 15 min. |
| Calls In Queue | Total of all queued route requests. |
| Time/Date | Access to all time values (hours, minutes, seconds, and milliseconds). Access to all date values (month, day, year, and day of week). |
| ANI | Access to NPANXXXXXX, NPA, NXX, and XXXX. |
| DNIS | The toll-free number dialed. |
| InfoDigits | Information Digit Pair (II digits). These codes are passed by the switch and conform to the ANI Information Digits Codes assigned by NANPA at the request of the Industry Numbering Committee. |

NRRM 134C is also a major customer of Statistics Manager 134R. NRRM 134C uses information retrieved to determine the appropriate SelectCodeType and SelectCode for network routing. Statistics Manager 134R receives event messages from application 134 when telephony-server ports change status. Statistics Manager 134R tracks the current status of each port of each telephony server 116 within the switching environment 113. Statistics Manager 134R then keeps track of which ports are connected to which protocol converter 122. This allows Statistics Manager 134R to provide NRRM 134C with the information to decide with which SelectCode to respond to SCP 130. This also builds an additional level of survivability into the platform in that the present invention will know when there is an issue in the telephony connectivity of the platform and route calls accordingly.

Reporting Manager

Within the framework of application 134, Reporting Manager 190 stores data it receives from the standard operational procedures within the other services and reports it to the Store 'N' Forward Database 136. All reporting applications are preferably driven off of the data in this database. In a preferred embodiment, no data output streams are provided by application 134.

Switching Environment

The present invention is consistent with system requirements of a standard Severity Level 1 application server. Preferably, many levels of redundancy including; redundant servers, CPUs, network cards, disks and power supplies are included. The following are exemplary hardware component specifications.

TABLE G

Exemplary System Requirements

| Requirement | Definition |
|---|---|
| Systems | Currently planned for 2 application 134s. One in each DMS site. |
| CPU | 2 Ultra Sparc Iii processors. |
| Memory | Due to the caching of the entire Customer Preferred Routing database, and the massive amounts of statistical data used within RSEE 134G, the system will preferable have at least 2 Gigabytes of memory. |
| Disks | The present invention employs a SEV 1 availability rating and the need for high-speed disk access in certain situations. Thus, the system preferably employs minimum 3 disks configured for RAID 0 + 1. The storage requirements for the system are that it house enough storage to handle a SEV 3 outage on the Store'N'Forewward Reporting Database. Roughly estimated, this equates to no more than 36 Gigabytes. |
| Network Cards | To comply with SEV 1 availability, the system should be configured with 2 100 Mb network cards. |
| Additional Cards | Due to the connectivity requirements associated with the a communications network, the system is preferably configured with 4 × .25 cards configured to communicate with each node. |
| Power | To comply with SEV 1 availability, the system should be configured with redundant power supplies. |

Enhanced SiteRP Application Protocol

This section provides detailed message structure and definition for various different messages transmitted between SCP 130 and application 134. For additional information on the SiteRP protocol, please see the Intelligent Network Service Delivery's EnhanCED SiteRP Interface Specification, which is incorporated herein by reference.

Link Protocol. X.25 (CCITT, 1984) can be utilized on the data links. Each data link can be configured with pairs of Logical Channels/Permanent Virtual Circuits (PVC) as illustrated in Table H.

TABLE H

PVC Configuration

| LCI | PVC | PVC Pair | Direction | Message Category |
|---|---|---|---|---|
| 1 | 1 | 1 | SCP => RP | Management Messages |
| 2 | 2 | 1 | SCP <= RP | Management Messages |
| 3 | 3 | 2 | SCP => RP | Inquiry/Response Msgs |
| 4 | 4 | 2 | SCP <= RP | Inquiry/Response Msgs |

When redundant data links are used, each link is preferably independently setup. The X.25 multilink protocol is preferably not used. SCP 130s will be DCEs. The RPs will be DTEs. The parameter values to be used on the X.25 data links are as follows in Table I and Table J.

TABLE I

Link Layer

Modulo 8 Sequencing
Link Level Window K = 7
Acknowledgment Timer T1 = 3 seconds
Acknowledgment Action Timer T2 = 1.5 seconds, nominally
Idle Channel Timer T3 = 15 seconds
Link Assurance Timer T4 = 15 seconds
Maximum Bits in an I-Frame N1 = 1080 bits
Maximum Number of Transmissions and Retransmissions N2 = 3

TABLE J

Packet Layer

Maximum User Data Field Length of Data Packets = 128
Modulo 128 Sequencing
Default Window Size = 15

Message summary. Table K lists the application messages for SiteRP in a preferred embodiment.

TABLE K

Message Summary

| Message Type | Message Name | Direction | PVC | Applies to: |
|---|---|---|---|---|
| 01 | Inquiry | SCP=>RP | Call Proc | Single Call |
| 02 | Inquiry Response | RP=>SCP | Call Proc | Single Call |
| 03 | Initialize | SCP=>RP | All | Link |
| 04 | Initialize | RP=>SCP | All | Link |
| 05 | Initialize Response | Both | All | Link |
| 06 | Status | Both | All | Link |
| 07 | Negative Ack | Both | All | Message |
| 08 | Orderly Shutdown | RP=>SCP | Management | Entire RP |
| 09 | Mngt Msg Resp | SCP=>RP | Management | Message |
| 10 | Statistics Request | RP=>SCP | Management | Link |
| 11 | Statistics Response | SCP=>RP | Management | Link |
| 12 | Status Response | Both | All | Link |
| 81 | "EnhanCED Inquiry" | SCP=>RP | Call Proc | Single Call |

Inquiry Message. SCP 130 generates an Inquiry message to the RP if it encounters a SiteRP node during processing of the toll-free routing tree. The Inquiry message provides the RP with the ANI, DNIS, and a SiteRP node identifier. The RP uses this information to determine the appropriate SelectCodeType and SelectCode to be returned to SCP 130 in the form of an Inquiry Response Message. The specifications of the Inquiry Message are shown below in Table L.

TABLE L

Inquiry Message Format

| Field Name | Start Byte | Length (Bytes) | Field Type | Comments |
|---|---|---|---|---|
| MsgType | 0 | 2 | X | 01 = Inquiry |
| InqId | 2 | 10 | B | Inquiry Identification. Unique number used to correlate queries to responses. The two higher order bytes are reserved for identifying SCP 130 (highest order byte) and the processor within that SCP. |
| ANI | 12 | 10 | N | Calling Number (ANI). Entire field or portions may be blank if not received from the switch. |
| DNIS | 22 | 10 | N | The toll-free number called. (ZZZ-NXX-XXXX) ZZZ is either 800 or 8888. NXX is from 200 to 999. XXXX is from 0000 to 9999. |
| X25-Label | 32 | 8 | X | Customer-specific identification of SiteRP node. |

Inquiry Response Message. In a preferred embodiment, the RP provides a response to SCP 130's Inquiry message (for example, within 500 milliseconds) or SCP 130 will use default routing to route the call. If the Inquiry Response message is received late, it is discarded by SCP 130. The Inquiry Response message includes the SelectCodeType and the SelectCode for the specified call. The SelectCodeTypes and their actions are defined in Table M and Table N below.

TABLE M

Inquiry Response (SelectCode/Type)

| SelectCodeType | Action | SelectCode |
|---|---|---|
| T | Proceed to specified node in routing tree. | Next node identifier. |
| F | Use default routing predefined for this SiteRP node. | Not used. |
| R | Reject call using specified treatment number. | Treatment Number. |
| E | Error in processing Inquiry. Use default routing predefined for this SiteRP node. | Error Data. |

TABLE N

Inquiry Response Message Format

| Field Name | Start Byte | Length (Bytes) | Field Type | Comments |
|---|---|---|---|---|
| MsgType | 0 | 2 | X | 02 = Response to Inquiry. |
| InqId | 2 | 10 | B | Inquiry Identification. Same value as incoming InqId from SCP 130. |
| SelectCode Type | 12 | 1 | X | Type of SelectCode: T - Translate the SelectCode to identify the next node to execute. E - Error in processing Inquiry- |

TABLE N-continued

Inquiry Response Message Format

| Field Name | Start Byte | Length (Bytes) | Field Type | Comments |
|---|---|---|---|---|
| SelectCode | 13 | 10 | X | Use default processing. Reason detailed in SelectCode field. F - Use default processing. Same treatment for all brands or unidentified type. R - Reject the call. Treatment number is in SelectCode. (1 = Slow Busy, 2 = NPA Blocked Recording). Code returned from RP which is used for routing. Contains brief reason for error in case of a SelectCodeType of "E." Contains treatment number (2 digits) in first 2 positions for type "R." |

Initialize Response Messages. The initialize message is sent to start, processing on a link in a preferred embodiment. An SCP may be configured to send or receive Initialize messages on a data link, but the preferred method is to have the RP send the Initialize messages to SCP 130. This message should be sent on the outgoing PVC of both PVC pairs. Initialization is successful when an Initialize Response message is received on the incoming PVC of either PVC pair. The formats of the messages are defined in Table O below.

TABLE O

Initialize/Response Message Format

| Field Name | Start Byte | Length (Bytes) | Field Type | Comments |
|---|---|---|---|---|
| MsgType | 0 | 2 | X | 03 = Initialization from SCP. 04 = Initialization from RP. 05 = Response to initialization. |
| InqId | 2 | 10 | B | Inquiry Identification. Unique number used to correlate queries to responses. The two higher order bytes are reserved for identifying SCP 130 (highest-order byte) and the processor within that SCP. |

Status Message. One purpose of the Status message is to verify that a link in question is operational. This helps identify link or application failures promptly for clean communications. A Status message can be sent by both SCP 130 and the RP and is preferably responded to promptly, on the same PVC pair, with a Status Response message. SCP 130 can be hard coded to send a Status message on each PVC pair periodically, such as every ten seconds, and be responded to within another period, such as three seconds, or it will put the associated X.25 line out-of-service. The formats of the messages are defined in Table P below.

TABLE P

Status/Response Message Format

| Field Name | Start Byte | Length (Bytes) | Field Type | Comments |
|---|---|---|---|---|
| MsgType | 0 | 2 | X | 06 = Initialization from SCP. 12 = Initialization from RP. |
| InqId | 2 | 10 | B | Inquiry Identification. Unique number used to correlate queries to responses. The two higher-order bytes are reserved for identifying SCP 130 (highest-order byte) and the processor within that SCP. |

Negative Acknowledgment Message. The Negative Ack message can be sent by either the RP or SCP 130s. This message is sent when an unintelligible or unidentifiable message has been received, or when the application protocol violation has occurred. The length of the erroneous message and the first 36 bytes of the erroneous message are inserted into the Negative Ack message. If the erroneous message is less than 36 bytes long, then the remainder of the MsgRecvd field should be padded with binary zeroes. The Negative Ack message could contain the error codes of Table Q and be formatted as shown in Table R:

TABLE Q

| Error Code | Message |
|---|---|
| 01 | Short Message |
| 02 | Unidentified Message Type |
| 03 | Unknown Toll-Free Number |
| 04 | Unknown SiteRP Node |
| 05 | Message Received before Initialization |

TABLE R

Negative Acknowledgement Message Format

| Field Name | Start Byte | Length (Bytes) | Field Type | Comments |
|---|---|---|---|---|
| MsgType | 0 | 2 | X | 07 = Negative Acknowledgement. |
| InqId | 2 | 10 | B | Inquiry Identification. Unique number used to correlate queries to responses. The two higher-order bytes are reserved for identifying SCP 130 (highest order byte) and the processor within that SCP. |
| NumErr | 12 | 10 | N | Numeric error code. At least the following errors will be defined: 01 - short message 02 - unidentified message type 03 - inquiry for unknown toll-free number 04 - inquiry for unknown node 05 - message received before initialization |
| Msg Length | 22 | 3 | N | Length of message in error. |
| Msg Recvd | 25 | 36 | X | Up to first 36 bytes of erroneous message, padded with low values. |

Orderly Shutdown/Management Message Response Message. This message is used by the RP to notify SCP 130 that it is shutting down. Upon receipt of this message by SCP 130, no messages will be transmitted to the RP on any link in a preferred embodiment. It is preferred that the Orderly Shutdown message be sent on the Management Messages PVC. However, SCP 130 will accept the message on any PVC. The message format is defined in Table S below. SCP 130 will respond to the Orderly Shutdown message with a Management Response message.

TABLE S

Orderly Shutdown Message Format

| Field Name | Start Byte | Length (Bytes) | Field Type | Comments |
|---|---|---|---|---|
| MsgType | 0 | 2 | X | 08 = Orderly Shutdown Message. 09 = Management Message Response. |
| InqId | 2 | 10 | B | OS - Orderly Shutdown Request Identification. MMS - Same value as shutdown message. |

Statistics Request Message. The Statistics Request message is used by the RP to retrieve routing statistics from SCP 130. This message is preferably limited to fewer than twenty requests per hour per RP. This feature, as are many described, is optional. The formats of the messages are found in Table T and Table U.

TABLE T

Statistics Request Message Format

| Field Name | Start Byte | Length (Bytes) | Field Type | Comments |
|---|---|---|---|---|
| MsgType | 0 | 2 | X | 10 = Statistics Request. |
| InqId | 2 | 10 | B | Statistics Request Identification. |
| InqRecvd | 12 | 10 | N | The total number inquiries received at the RP on this link since the session was initialized. (up to 2,147,483,648) |
| InqConErr | 22 | 10 | N | The number of inquiries containing errors that have been received. |
| RespSent | 32 | 10 | N | The number of responses set from RP to SCP. |

TABLE U

Statistics Response Message Format

| Field Name | Start Byte | Length (Bytes) | Field Type | Comments |
|---|---|---|---|---|
| MsgType | 0 | 2 | X | 11 = Statistics Request. |
| InqId | 2 | 10 | B | The same value as InqId of the Statistics Request message to which this is a response. |
| InqSent | 12 | 10 | N | The number of inquiry messages sent by SCP 130 since the circuit was initialized. |
| RespRecvd | 22 | 10 | N | The number of responses to inquiries received before time-out. |
| InqTimeout | 32 | 10 | N | The number of inquiries which timed-out. |
| UnMtchResp | 42 | 10 | N | The number of responses for which the inquiry could not be identified. These are error conditions. |
| ErrRespRecvd | 52 | 10 | N | The number of response messages containing error indications plus the number of Negative Acknowledgement messages. |

"EnhanCED Inquiry" Message. When processing the toll-free routing tree, if an SCP toll-free application encounters a SiteRP node, it generates an "EnhanCED Inquiry" message to the RP if the ANI is a SUTN (Special Unique Tracking Number) used to correlate the database entries to the context of a particular call). The "EnhanCED Inquiry" message provides the RP with the ANI, DNIS, a SiteRP node identifier, along with any objects such as Call Entered Digits (CED). The standard Inquiry Response message is returned to SCP 130 to respond to this request. The format of this message can be found in Table V.

TABLE V

EnhancCED Inquiry Message Format

| Field Name | Start Byte | Length (Bytes) | Field Type | Comments |
|---|---|---|---|---|
| MsgType | 0 | 2 | X | 8' '1' = "EnhanCED Inquiry". |
| Message Length | 2 | 2 | W | Count of bytes immediately following this field. (Message Length = 4 equals size of "EnhanCED Inquiry" message). |
| InqID | 4 | 10 | B | Inquiry ID. Unique number to track queries to responses. |
| II digit pair | 14 | 2 | N | Information Digit Pair (II digits). These codes are passed by the switch and conform to the ANI Information Digits Codes assigned by NANPA at the request of the Industry Numbering Committee. |
| ANI | 16 | 10 | N | Calling Number (ANI). Entire field or portions may be blank if not received from the switch. |
| Expansion | 26 | 10 | X | Future expansion reserved fields. |
| DNIS | 36 | 10 | N | This is the outdialed number used by ESP. |
| SiteRP-Label | 46 | 8 | X | Customer-specified identification of SiteRP node. (X.25-Label) |
| CRID Object (3 elements) | 54 | 12 | V | ID  1 Byte = 20 (14h)<br>CRID Length  1 Byte = 10 (0Ah)<br>CRID  N (10 char) SUTN |
| Number Objects | 66 | 2 | W | Count of the number of Objects included in the message pertaining to |
| Digit Parameter Object | 68 | ? | V | this call. Caller Entered Digits or Context information. |

Figure 12:
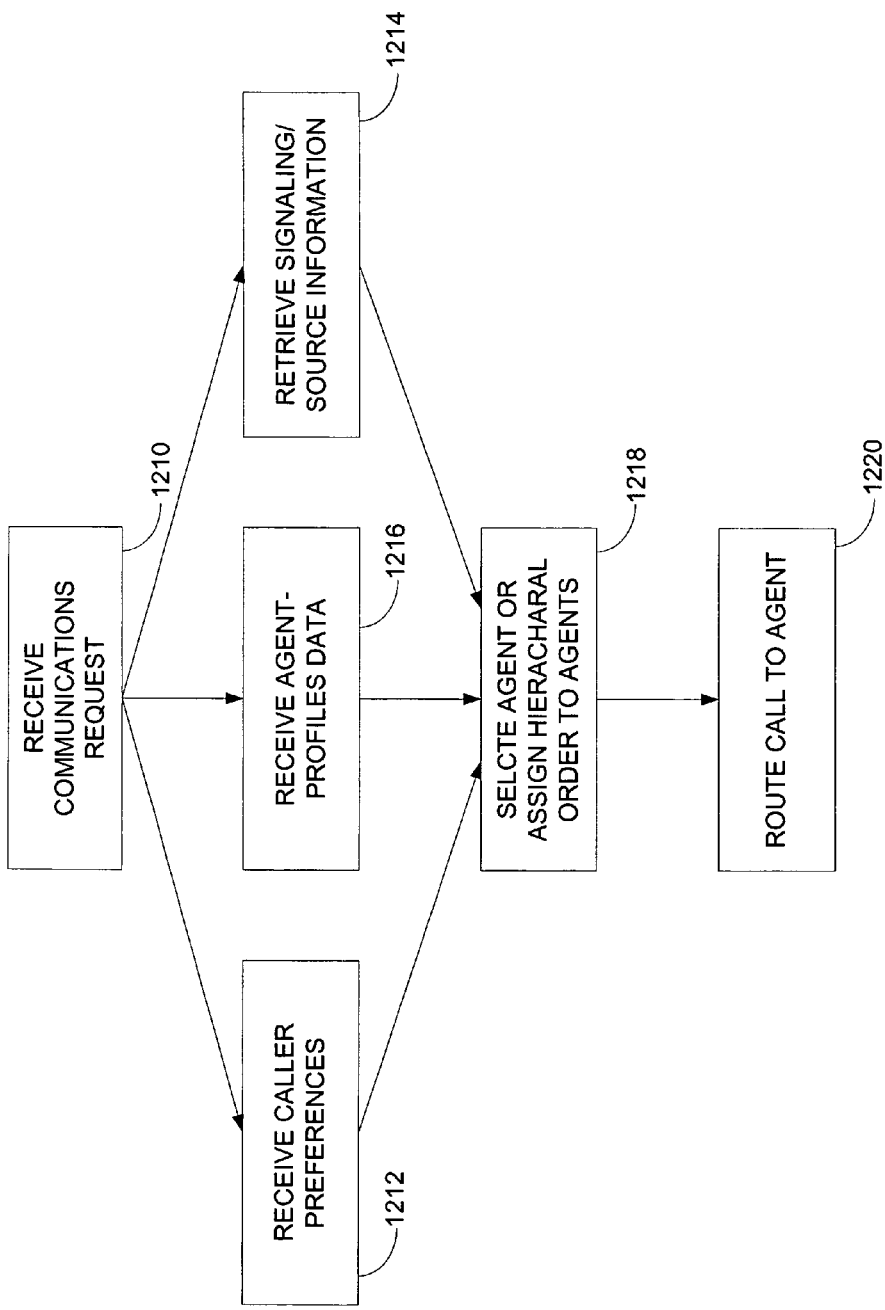
FIG. 12 provides an illustrative flowchart depicting multiple methods contemplated by various implementations in accordance with multiple embodiments of the present invention.

FIG. 12 provides an illustrative flowchart depicting multiple methods contemplated by various embodiments of the present invention. At a step 1210, a communications request is received. As previously mentioned, the communications request can take the form of a conventional telephone call placed via a telephone 126 or TTY device 128. The communications request can also include other forms of communications such as packets received from a public or private data network including the Internet 120.

In one embodiment, the communications request can travel from DMS 124 through SCP 130 to be received by application 134. In various embodiments, different steps can be performed incident to receiving the communications request from a user at step 1210. In a first embodiment, a set of preferences associated with the user can be received at a step 1212. These caller preferences may be stored in database 136 and include such preferences as a language preference, a communications-type preference, a target destination preference, a call type, a communication mode, and/or an agent gender. The communication-type preference can include various types of communications such as voice, teletype, or imaging.

The preferences associated with the user are stored in database 136 to offer a high level of service to the calling or called party. Typically, a user may be deaf or hard-of-hearing. If a person is deaf and often makes calls via the present invention then associating a set of preferences with that user can greatly increase that user's experience so as to provide that user with a level of service that persons who are not hard-of-hearing typically take for granted. In some embodiments, the caller preferences may be received in connection with retrieving signaling or source information at a step 1214.

As previously described, the present invention can extract data based on the type and source of the communications request. For example, if the communications request is received as a conventional telephone call, then the SS7 signaling information can be retrieved such as the originating phone number or the destination phone number. The source phone number or IP address can be compared against data in database 136 to retrieve preferences associated with the user or it can be used independently of a data comparison to route the call directly. For instance, if a user calls into the system, his or her phone number can be retrieved from the signaling information. That phone number can then be used to reference a set of preferences in database 136 such as a Spanish-speaking female agent.

At a step 1216, agent-profiles data is received to determine the best agent from agent pool 110 available to facilitate the communications request. Application 134 can then make an intelligent decision as to which agent should receive the request. In some embodiments, a specific agent is identified. In other embodiments, the pool of agents is ranked or ordered in a hierarchy so that the agent most matching the characteristics of the user profile will be ranked highest. If that agent is not available, then an alternative agent will be suggested by the system. Various factors such as wait time and hold time can then be introduced so as to best route an individual's communication request to a specific agent 112. Selecting a specific agent or assigning a hierarchy of agents occurs at a step 1218 in an embodiment of the present invention.

FIG. 12 also depicts the parallel processing of determining and routing the request to a specific call center at a step 1220. Routing the request to a specific call center and determining the best call agent begins to occur at substantially the same time. That is, when application 134 receives the communications request it both returns a designation of a call center (which can be one of the telephony servers 116) and also begins to determine which agent is the best agent to satisfy the communications request once the communications request reaches telephony server 116. Thus, as the site identification information flows back through path 152, to SCP 130, through path 150, to DMS 124, to protocol converter 122, application 134 is identifying the best agent to satisfy the communications request.

As previously mentioned, application 134 is in constant communication with the agent pool via XML data stream 162 and XML-RPC requests 160. In a preferred embodiment, application 134 knows at all times the status and availability of the agents in agent pool 110 as well as the availability of bandwidth and hardware limitations in the switching environment 113. Application 134 provides the necessary information to route the call to a specific agent at a step 1220. The agent identification is preferably made in a sufficiently short period of time such that when the communications request is received at telephony server 116, -call processor 14 immediately knows which agent should facilitate the call. The call is routed immediately to that agent, reducing or eliminating any lag time from the customer's point of view.

As can be seen, the present invention and its equivalents are well-adapted to providing a new and useful method for routing communications requests. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon for performing a method for developing call-routing instructions, said method comprising:

displaying a graphical user interface (GUI) having a canvas;

providing in said GUI a plurality of geometric shapes respectively corresponding to a plurality of functional tasks, wherein each of the plurality of geometric shapes comprises a distinct reference symbol that is presented on the canvas as a graphical representation specific to each of the plurality of functional tasks;

directing the graphical symbol of a first geometric shape to appear on said canvas;

generating a first code segment corresponding to said directing said geometric shape to appear on said canvas;

successively directing multiple geometric shapes to appear on said canvas;

establishing a relationship between one or more of said first and multiple geometric shapes to create a programmatic flow diagram, whereby a call-routing script is generated based on the established relationships in said programmatic flow diagram; and routing calls according to said generated call-routing script, wherein the call-routing script facilitates selecting an appropriate agent for receiving the calls.

2. The computer-readable media of claim 1, wherein said functional tasks include routing communications requests.

3. The computer-readable media of claim 2, wherein said communications requests are telephone calls or data packets.

4. The computer-readable media of claim 2, wherein direction a first geometric shape to appear on said canvas includes occurs incident to receiving a first command from a user to so direct said geometric shape.

5. The computer-readable media of claim 4, wherein generating said first code segment includes automatically generating said code segment incident to the placement of said geometric shape onto said canvas.

6. The computer-readable media of claim 4, wherein establishing a relationship between said geometric shapes includes connecting said geometric shapes with a line from said GUI.

7. A method of dynamically rerouting a call in a communications network, said method comprising:

generating a route script from a first relationship of a first set of graphical objects, wherein the first set of graphical objects corresponds to instruction modules that comprise the route script, and wherein each of the instruction modules comprise user-defined formulas to select an appropriate agent for the call;

routing the call on call-routing paths based on the route script;

modifying said first relationship of said first set of graphical objects; and automatically modifying said route script in response to said modifying said first relationship; whereby the call-routing paths to the appropriate agent are varied incident to said modifying said route script.

8. The method of claim 7, wherein routing calls based on a route script includes routing communications requests composed of data packets.

9. The method of claim 8, wherein generating said route script includes assembling a computer-program from the arrangement of said graphical objects.

10. The method of claim 9, wherein modifying said first relationship of said first set of graphical objects includes adding additional graphical objects to said first set.

11. The method of claim 7, further comprising routing calls consistent with said modified route script to the appropriate agent, wherein the appropriate agent is an intermediary between a call initiator with an impairment and a call party, and wherein the appropriate agent is assigned in accordance with specific characteristics related to the impairment that are provided by the call initiator.

12. One of more computer-readable media having computer-useable instructions embodied thereon for performing the method of claim 7.

13. A method for assisting a user in creating a call-routing program, said method comprising:
 providing a development environment that includes a plurality of graphical objects and a canvas;
 associating said one or more graphical objects with respective computer-code portions, wherein the computer-code portions, upon execution, defines an operation that performs data operation and instructs the call-routing program which of the one or more graphical objects to address next; and
 providing for an arrangement of said plurality of graphical objects on said canvas; whereby said arrangement generates a computer-program from said respective code portions, wherein the computer program provides instructions as to which agent is appropriate for receiving a call from the user.

14. The method of claim 13, wherein providing said development environment includes proving a graphical menu-bar to house a selection of one or more of said plurality of graphical objects.

15. The method of claim 14, wherein said canvas is a screen area available to establish a relationship between said one or more graphical objects.

16. The method of claim 15, wherein said arrangement includes linking one of more of said plurality of graphical objects to each other.

17. The method of claim 16, wherein said computer program routes communications in a networking environment.

18. Routing communications requests in a networking environment using the computer program generated in claim 13.

19. A method for assisting a user in updating call-routing solutions in a communications-networking environment, said method comprising;
 providing one or more call-routing scripts that dictate how a plurality of communications should be routed;
 providing a graphical representation of said one or more call-routing scripts, said graphical representation including a plurality of graphical objects where the arrangement of said objects corresponds to a programmatic code segment that composes said one or more call-routing scripts;
 receiving from the user a route request that includes user-defined transfer information that is accessible to an execution engine;
 accessing global data that is relevant to other route requests being processed in the communications-networking environment;
 utilizing the execution engine to manipulate the arrangement of said graphical objects in accordance with the user-defined transfer information and the global data, whereby said one or more call-routing scripts are correspondingly modified; and
 rerouting communications requests to an appropriate agent of an agent pool based on said modified call-routing scripts.

20. The method of claim 19, wherein said plurality communications include one or more of the following:
 a request to complete a telephone call;
 a request to route one or more data packets;
 a request to establish video link; and
 a request to establish a streaming-media link.

21. The method of claim 20, wherein manipulating the arrangement of said graphical objects includes one or more of the following:
 adding additional graphical objects;
 changing a relationship between one or more of said graphical objects; and remove graphical objects.

22. A system for updating call-routing paths in a communications-networking environment, said system comprising:
 a route script execution engine (RSEE);
 a plurality of route scripts to be processed by said RSEE and to dictate call routing paths; and
 a graphical route-scripting interface comprising an arrangement of a plurality of graphical objects, said arrangement corresponding to a programmatic composition of said plurality of route scripts, wherein each of the plurality of graphical objects comprises a reference symbol that is presented on a canvas as a distinct graphical representation specific to each programmatic representation;
 whereby the modification of said arrangement of said plurality of graphical objects translates to a modification of one or more of said plurality of route scripts, thereby modifying one more physical call-routing paths, wherein the one or more physical call-routing paths connects a user to an appropriate agent as selected by said plurality of route scripts.

23. The system of claim 22, wherein said RSEE includes:
 a route script execution engine interface; and
 a request queue manager coupled to said route script execution engine interface.

24. The system of claim 22, wherein physical call-routing paths include a logical call path.

25. Routing a plurality of communications requests using the system of claim 22.

26. The method of claim 19, wherein rerouting communications requests further comprises:
 reserving the appropriate agent that meets criteria of the user-defined transfer information; and
 updating the global data that the appropriate agent is reserved, wherein an event that describes the update global data is broadcast to other execution engines linked to the execution engine.

27. The method of claim 19, further comprising:
 retrieving a status information, profile information, and statistical information related to each agent in the agent pool;
 retrieving port-capacity data of an architecture of the communications-networking environment; and
 basing the rerouting of the communications requests, in part, on the agent information and the port-capacity data.

* * * * *